(12) United States Patent
Botha et al.

(10) Patent No.: US 8,121,057 B1
(45) Date of Patent: Feb. 21, 2012

(54) WIDE AREA VOICE ENVIRONMENT MULTI-CHANNEL COMMUNICATIONS SYSTEM AND METHOD

(75) Inventors: Shaun Botha, Seattle, WA (US); Derick J. Clack, Seattle, WA (US); Georgina Charlotte Rebane, Seattle, WA (US)

(73) Assignee: Twisted Pair Solutions, Inc., Seattle, WA (US)

( * ) Notice: Subject to any disclaimer, the term of this patent is extended or adjusted under 35 U.S.C. 154(b) by 1934 days.

(21) Appl. No.: 10/977,115

(22) Filed: Oct. 29, 2004

Related U.S. Application Data

(60) Provisional application No. 60/516,233, filed on Oct. 31, 2003.

(51) Int. Cl.
*H04L 12/16* (2006.01)

(52) U.S. Cl. .......................... 370/270; 370/290; 370/432

(58) Field of Classification Search ................... 370/312
See application file for complete search history.

(56) References Cited

U.S. PATENT DOCUMENTS

| | | | |
|---|---|---|---|
| 5,327,428 A | 7/1994 | Van As et al. | |
| 5,617,539 A | 4/1997 | Ludwig et al. | 395/200.02 |
| 5,916,302 A | 6/1999 | Dunn et al. | 709/204 |
| 5,987,518 A * | 11/1999 | Gotwald | 709/230 |
| 6,021,119 A | 2/2000 | Derks et al. | 370/261 |
| 6,130,880 A | 10/2000 | Naudus et al. | |
| 6,163,692 A | 12/2000 | Chakrabarti et al. | 455/416 |
| 6,275,575 B1 | 8/2001 | Wu | 379/202.01 |
| 6,314,089 B1 | 11/2001 | Szlam et al. | 370/270 |
| 6,477,366 B1 | 11/2002 | Valentine et al. | 455/416 |
| 6,501,739 B1 | 12/2002 | Cohen | 370/260 |
| 6,504,836 B1 | 1/2003 | Li et al. | 370/349 |
| 6,535,486 B1 | 3/2003 | Naudus et al. | |
| 6,591,301 B1 | 7/2003 | Li et al. | |
| 6,603,965 B1 | 8/2003 | Dinkin | 455/416 |
| 6,628,625 B1 | 9/2003 | Birdwell et al. | 370/270 |
| 6,631,415 B1 | 10/2003 | James et al. | 709/227 |
| 6,697,342 B1 | 2/2004 | Smyth et al. | 370/260 |
| 2001/0049283 A1 | 12/2001 | Thomas | 455/426 |
| 2001/0055279 A1 | 12/2001 | Abe | 370/260 |
| 2002/0029278 A1 | 3/2002 | Shiouchi et al. | 709/229 |
| 2002/0064149 A1 * | 5/2002 | Elliott et al. | 370/352 |
| 2002/0069278 A1 | 6/2002 | Forslöw | 709/225 |
| 2002/0101829 A1 | 8/2002 | Murai et al. | 370/260 |
| 2002/0161841 A1 | 10/2002 | Kinnunen | 709/206 |
| 2002/0188865 A1 | 12/2002 | Joseph et al. | 713/201 |

(Continued)

OTHER PUBLICATIONS

Twisted Pair Solutions, LLC, "Success Story: The United States Coast Guard uses WAVE to Enhance and Extend the Reach of its Radio Communications System."

(Continued)

*Primary Examiner* — Jianye Wu

(74) *Attorney, Agent, or Firm* — Schwabe, Williamson & Wyatt, P.C.

(57) ABSTRACT

A system and method is described for establishing a homogenized communications infrastructure that enables a variety of disparate communication devices to communicate transparently with each other over a computer data network. The system and method allow for such communications to take place by converting all communications from all participants in the form of audio, video, textual, and binary data messages into discrete data units that are carried over a computer data network. These communications are propagated to other participants by relay to their particular devices in such a way that individual participants are insulated from the type and implementation of all other participants' devices.

18 Claims, 24 Drawing Sheets

U.S. PATENT DOCUMENTS

| | | | | |
|---|---|---|---|---|
| 2003/0002448 | A1* | 1/2003 | Laursen et al. | 370/261 |
| 2003/0012149 | A1 | 1/2003 | Maggenti et al. | 370/260 |
| 2003/0018792 | A1 | 1/2003 | Shiouchi et al. | 709/229 |
| 2003/0037109 | A1 | 2/2003 | Newman et al. | 709/204 |
| 2003/0041141 | A1 | 2/2003 | Abdelaziz et al. | 709/223 |
| 2003/0058858 | A1 | 3/2003 | Berlyoung et al. | 370/390 |
| 2003/0128689 | A1 | 7/2003 | Peirce, Jr. et al. | 370/351 |
| 2003/0137959 | A1* | 7/2003 | Nebiker et al. | 370/338 |
| 2003/0233538 | A1 | 12/2003 | Dutertre | 713/151 |
| 2004/0001446 | A1 | 1/2004 | Bhatia et al. | 370/261 |
| 2004/0052218 | A1 | 3/2004 | Knappe | 370/260 |

OTHER PUBLICATIONS

Twisted Pair Solutions, LLC, "Success Story: The United States Air Force Global Hawk Team Sets Up Instant Communications Using WAVE."

Twisted Pair Solutions, LLC, "Success Story: USDA Forest Service: Land Mobile Radio Over IP with WAVE."

Twisted Pair Solutions, LLC, "WAVE—Scalable Instant Communications," Copyright 2002, retrieved Feb. 5, 2004, from http://www.twistpair.com/products/wave/default.asp.

Twisted Pair Solutions, LLC, "WAVE—Scalable Instant Communications: Frequently Asked Questions," Copyright 2002, retrieved Feb. 5, 2004, from http://www.twistpair.com/products/wave/faq.asp.

Twisted Pair Solutions, LLC, "WAVE: Conferencing Features of the WAVE Media Server.", Feb. 5, 2004.

Twisted Pair Solutions, LLC, "TPS Article #67—FAQ: Can I use WAVE as a conferencing system for regular phone calls?," Copyright 2002, retrieved Feb. 5, 2004, from http://www.twistpair.com/support/view_article.asp?id=67.

Twisted Pair Solutions, LLC, "WAVE: Using WAVE as a Hoot & Holler System."

Twisted Pair Solutions, LLC, "WAVE Data Sheet," Copyright 2003.

Twisted Pair Solutions, LLC, "WAVE . . . is here!," retrieved Mar. 4, 2004, from http://www.twistpair.com/default.asp.

Twisted Pair Solutions, LLC, "Envoy™—Flexible Information Delivery for CallManager Systems," Copyright 2002.

Twisted Pair Solutions, LLC, "WAVE: Solution Brief—Hoot & Holler," Copyright 2003.

Twisted Pair Solutions, LLC, "WAVE: Solution Brief—LMR Integration," Copyright 2003.

Twisted Pair Solutions, LLC, "WAVE: Solution Brief—Interoperability," Copyright 2003.

Twisted Pair Solutions, LLC, "WAVE: Solution Brief—Conferencing," Copyright 2003.

* cited by examiner

WIDE AREA VOICE ENVIRONMENT MULTI-CHANNEL COMMUNICATIONS SYSTEM AND METHOD

CROSS-REFERENCE TO RELATED APPLICATION

This application claims the benefit of U.S. Provisional Patent Application No. 60/516,233 filed Oct. 31, 2003, entitled "WIDE AREA VOICE ENVIRONMENT MULTI-CHANNEL CONFERENCING SYSTEM," where this provisional application is assigned to the same assignee as the present application and is incorporated herein by reference in its entirety.

TECHNICAL FIELD

This disclosure relates generally to computer software and/or hardware for computer and communication systems networking, and more particularly but not exclusively to a virtual peer-to-peer multi-channel communications system for carrying audio and other types of media between users on a computer data network and communications devices connected to said network.

BACKGROUND INFORMATION

Teleconferencing among groups of people has always been a troublesome task. Even arranging small teleconferences is time-consuming and requires a flurry of e-mail messages and telephone calls between individuals to agree on an appointed time, establish a conference host, and assign conference bridge numbers, access codes, etc.

The cost associated with teleconferencing can also be prohibitive, not only for conferences that use centralized third party bridges, but also for in-house meetings that use conferencing resources from a local system such as a PBX or Internet Protocol (IP) telephony system.

Conferences among very large groups of people such as a company-wide address by the organization's president can be so expensive or complex to set up that many organizations do not even bother with such meetings unless absolutely necessary.

Lastly, ad-hoc group communications across political, geographic and organizational borders at times of emergency where inter-agency, inter-state or even international co-operation is required takes time to put in place and may involve a great deal of "red tape" before people can actually communicate with each other. Often a technical solution is simply not available to facilitate the cross communication of users operating disparate communications devises such as computer, telephones and two-way radio systems.

There is, therefore, a need for a network-based solution to these challenges that provides a high-performance virtual peer-to-peer instant communications system that uses an existing computer data network to create massively scalable group communications channels having audio, video, and data content.

The general state of the art in this field is illustrated by the following published U.S. patents. U.S. Pat. No. 6,591,301 discloses a method and system for controlling network gatekeeper message processing. U.S. Pat. Nos. 6,535,486 and 6,130,880 disclose a method and apparatus for adaptive prioritization of multiple information types in highly congested communication devices. U.S. Pat. No. 5,327,428 discloses a method and system for collision-free insertion and removal of circuit-switched channels in a packet-switched transmission structure. However, these methods and systems do not address the issues of simultaneously communicating among a variety of disparate communication systems.

BRIEF SUMMARY OF THE INVENTION

According to one aspect, a method allows disparate communication devices to communicate with each other. The method includes converting, if needed, information communicated from any one of the communication devices into packets. Identification data is added to the packets to identify an IP session with which to associate the packets. The packets having the identification data are placed on a communication network. The method allows at least one communication device belonging to the IP session to select packets, from the communication network, that have the identification data associated with the IP session.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified or unless the context is otherwise.

DETAILED DESCRIPTION

Figure 1:
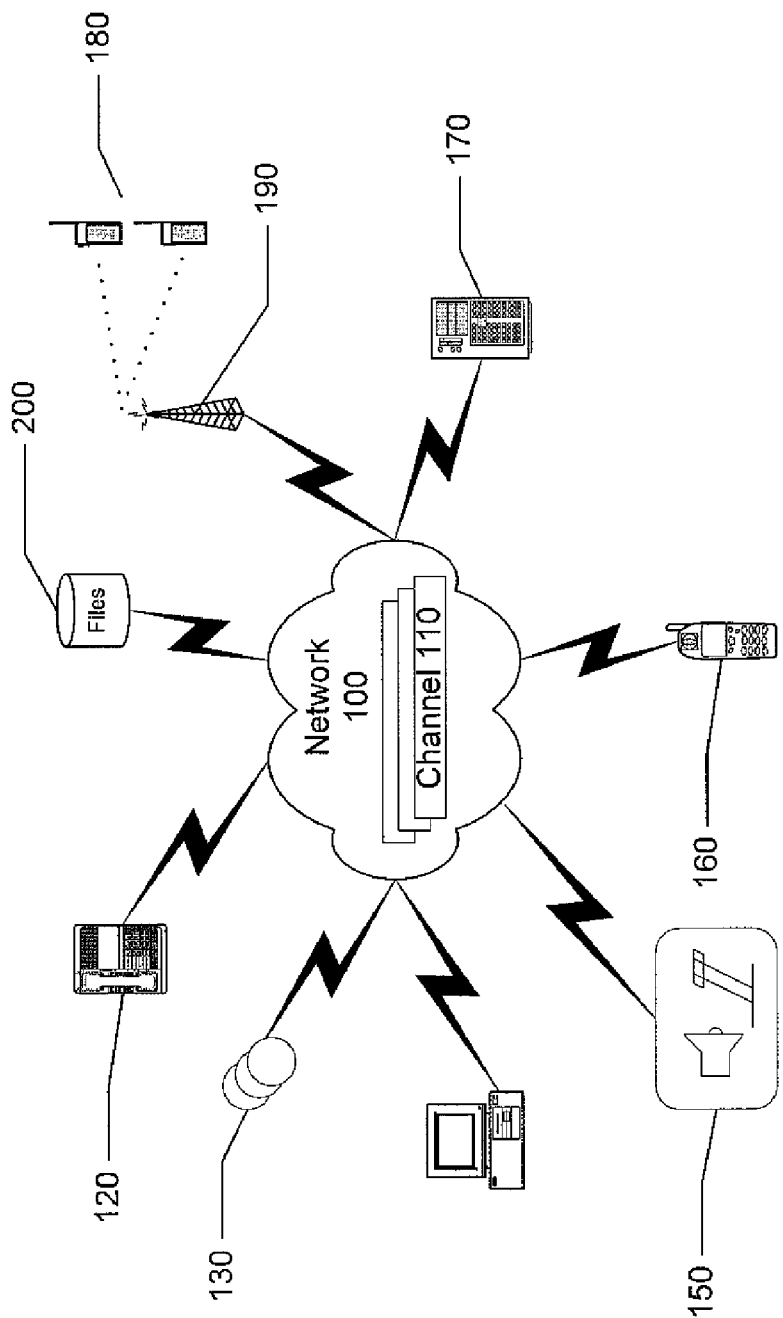
FIG. 1 is a logical system block diagram according to one embodiment of the present invention. The diagram shows the manner in which a variety of endpoints communicate with each via over a computer data network 100 by using one or more virtual channels 110 that represent communication streams to and from, and/or shared by those devices.

In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

As an overview, one embodiment of the invention provides a variation of the traditional definition of peer-to-peer computing, which involves the use of a peer-to-peer design for carrying audio and other types of media between users on a computer network. These users can be multimedia computer-based, IP, analog and digital phone-based, and (through an embodiment of the invention's Radio-over-IP features) can even be two-way radio users and operators, as non-limiting and non-exhaustive examples.

The peer-to-peer nature of one embodiment of the invention brings with it a number of benefits including massive scalability, simple maintenance, survivability (a peer-to-peer network does not rely on centralized servers, which can easily be single points of failure), and the ability to bring new endpoints and features online with the least amount of impact on the overall system.

A typical computer network includes a complex array of hubs, switches, routers and other network devices that make data-based communication between end-users possible. These devices collaborate to bring network traffic—mostly using Internet Protocol ("IP")—to endpoints such as personal computers (PCs) and Personal Digital Assistants (PDAs), servers, and IP phones.

In the case of IP specifically, there are two ends of the specification that dictate how data packets traverse the network—these are IP unicast and IP broadcast. IP unicast communications describe a point-to-point pathway between two devices such as PCs or IP phones on a network. IP broadcast, on the other hand, describes a point-to-multipoint communication design where senders of information broadcast their data onto a network with the intent that everyone else will receive it—even those that are disinterested in receiving the data.

IP multicast technology falls in-between these two extremes and can be considered a "controlled broadcast" where only the endpoints that are interested in receiving a transmission actually receive that data.

Until the broad-based adoption of IP telephony or Voice-over-IP (VoIP), most organizations typically did not have a need for multicast technologies. With the advent of IP telephony and other sophisticated technologies, such as video streaming, the need for organizations to consider implementing an IP multicast-enabled network has become of paramount importance.

Conferencing in a time division multiplexing (TDM) environment using a Private Branch Exchange (PBX) or a telephone company's central office switch (CO) typically relies on participants being able to establish individual phone calls to a central system that combines audio from each participant and delivers the now mixed audio to each of the other participants. The centralized mixer does more than simply combine everyone's audio and distribute it to everyone else—the centralized mixer combines audio in an "N minus 1" method where the audio sent to a particular participant is the combination of all the audio from all participants except the specific participant receiving that mixed audio. If this strategy is not followed, anyone speaking will hear all others speaking and also themselves.

Conferencing in an IP telephony environment operates much the same as TDM conferencing with the exception that audio received from and sent to participants is carried over an IP network instead of over traditional phone lines. In this scenario, the centralized mixer is equally complex with the added consideration of the network resources being required to carry the individual audio streams. For example: A conference between four people on an IP telephony system requires the services of a centralized audio mixing facility, generally located on the IP telephony server or on another dedicated hardware device. Each phone in the conference establishes a point-to-point pathway with the mixer, transmitting the participant's voice and receiving an audio mix of all the other people in the conference.

Depending on factors such as the media compression/decompression algorithms (e.g., "codecs") in use and network design, adding more people to the conference increases the load on the network as each new conference participant needs to receive a mixed copy of the audio transmitted by the other phones. The increase in bandwidth requirements when adding participants is linear in nature (i.e., each new participant requires additional bandwidth to receive and transmit audio).

In a small conference environment, this unicast model works well. It does not, however, scale well when very large numbers of participants are present. Due to the enormous complexity and cost of establishing a large conference for potentially several thousand participants, organizations cannot even consider such activities because their networks are not technically capable of handling the load. In addition no viable, cost-effective solution is currently available.

By using multicast technologies to propagate the audio stream of a speaker, one only needs a single stream per speaker in order for all participants to receive the audio at the same time—no matter how many participants are on the call. The total bandwidth required in a multicast is directly proportional to the number of speakers instead of the total number of participants—as occurs in a unicast environment. This means that multicast can support tens of thousands of participants on a single conference.

Assuming each of the endpoints have mixing capabilities of their own, a multicast environment therefore has no need for a centralized mixer and therefore no bandwidth duplication. In an embodiment of the invention, endpoints have this capability either directly available to them or proxied through a device or application that can perform the mixing on their behalf.

In the case of certain vendors' IP phones, those IP phones do have the ability to receive multicast audio, but only certain versions of IP phones are capable of mixing audio at the phone itself. In these cases, these IP phones can generally mix audio from two or three sources, and generally use the same codec (such as the G.711 codec, which operates at 64 kbps).

This means that all transmissions to and from those, partially compatible, IP phones use the codec and the maximum number of transmitters is two or three. Even though additional speakers can transmit their audio onto the network, they will not be heard by all other participants. Furthermore, most IP telephony systems do not currently have direct support for teleconferences using IP multicast.

While audio has been used in the above to describe the present state of affairs and the applicability embodiments of the invention, the dissemination of other media such as video faces exactly the same challenges and shortcomings.

Furthermore, the distribution of non-media data such as raw binary information, textual data, and other formatted and non-formatted forms of data must be addressed for individuals to communicate effectively with each other. For example: the real-time dissemination of radar information to a variety of operators in a flight control center, or the real-time communication of sensor information from a heart-rate monitor connected to a patient on their way to a hospital to the individuals in the hospital monitoring that patient's health en-route is crucial.

Embodiments of the present invention described herein addresses the needs described above and embodiments of the present invention have shown that it is applicable to the requirements, issues, problems, and concerns listed above.

An embodiment of the present invention therefore provides a method and system for communication, hereinafter sometimes referred to as a Wide Area Voice Environment (WAVE), to be used in a computer data network that offers a survivable infrastructure and that can be used for real-time conferencing between small or large groups of people anywhere on a communications network. An embodiment of the present invention provides a system wherein a user can integrate WAVE with an IP telephony system, and extend network-based communications to land mobile radio (LMR) systems or to other wireless or wired communication systems—all using industry standard network equipment.

The system of one embodiment works by allowing participants on a conference to "tune in" to a "channel" using multicast, and receive and transmit audio directly across the multicast without requiring a centralized mixer. The audio mixing is performed at the endpoint itself by the end device itself or a proxy acting on its behalf. In an embodiment, a physical "channel" is not per se generated. Rather, a "virtual" channel of one example embodiment is present by virtue of participants' packets that contain session identification (ID) or other ID information that identifies the particular multicast and/or unicast session or group that is associated with the participant. Thus, participants' devices or proxy devices can "tune" to a virtual channel by monitoring the network for particular packets having the relevant ID information and then receiving such packets. Other examples for determining the particular IP session for the packets include determining a transmitter source for each packet according to a network address of the transmitter, data type transmitted by the transmitter, media type transmitted by the transmitter, and other pertinent information embedded in the packet or sent alongside the packet by the transmitter or its proxy.

This design allows the system to operate in a completely peer-to-peer environment, meaning that there is no single point of failure. Furthermore, the design does not require mixed streams to be propagated to individual participants, thereby drastically reducing network bandwidth requirements and centralized mixing resources. Use of this design also means that individual endpoints in a conference do not need to be visible to each other. Users place their audio onto the network and receive audio from the network in the same way as if the participants in the conference were gathered around a conference room and were able to address the group as a whole without having to establish handshaking protocols with every other participant before initiating their speech.

For those endpoint clients (such as IP phones that cannot handle mixing of multiple sources, multiple channels, or a variety of codecs), a proxy is invoked in an embodiment to provide mixing services. The proxy operates in some manner like a centralized mixer but instead of propagating mixed audio into unicast streams, the proxy is configured to distribute mixed audio in a multicast manner. The result being that even though a—mixer in the form of a proxy has been brought into play, the bandwidth requirements of the network are only increased by the number of output streams from the proxy—and not by the number of participants receiving those streams. In an example of conference with four participants and two speakers, the bandwidth requirement on the output side of the proxy is one new stream, instead of four, as would be the case with a centralized mixer using a unicast distribution model.

Examples of devices that can be used to implement a proxy include, but are not limited to, off-the shelf end-user and server computers, and custom-built computers including single-board machines and custom-designed computer circuitry.

The system and method of embodiments of the present invention provide the ability for endpoints to access multiple channels in a multicast and/or unicast format at the same time, receive media from any number of sources or speakers, and be able to that process media—even if the media format is different for each speaker.

One embodiment of the present invention operates as a virtual peer-to-peer, massively scalable, IP-based communications solution with computing devices as endpoints—analogous to an IP-based intercom or "hoot and holler" system.

Additional participation on these channels is extended to devices that are not IP multicast capable or are limited in their ability to process multicast or unicast media, or are simply not capable or processing IP at all. These devices include, but are not limited to, IP phones, analog phones, digital phones, cellular phones, PDAs, analog and digital speaker and microphone systems, and two-way radio systems.

Over and above the aforementioned endpoints, an embodiment of the present invention includes participation on channels by other, less-common, sources and targets of real-time media. These include computer files used for recording and outbound streaming and $3^{rd}$-party media streams received over the computer data network from external sources.

Figure 14:
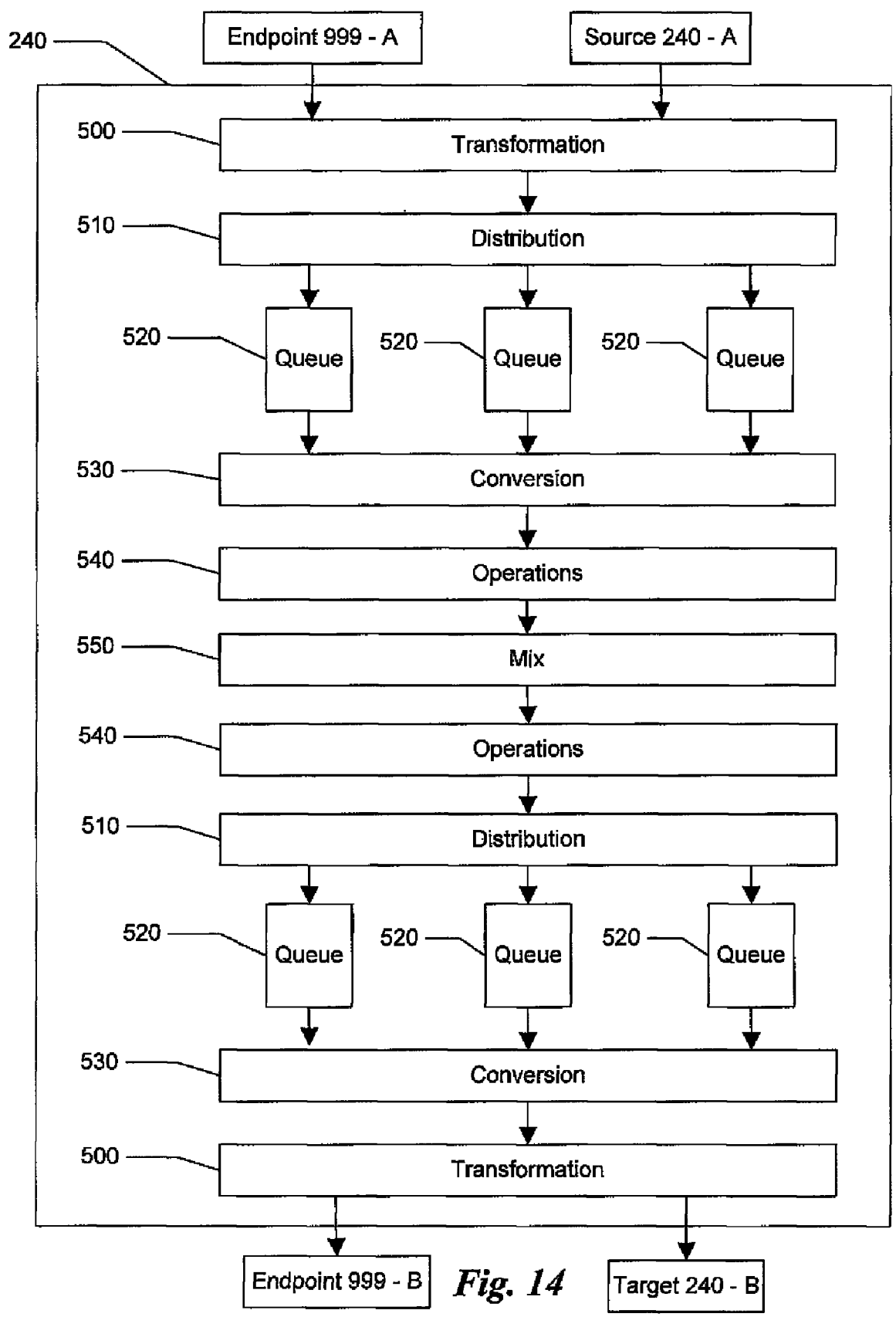
FIG. 14 is a logical block diagram showing a non-limiting example in which data is received from one or more instances of embodiments of the invention 240-A and a variety of other sources (collectively 999-A) and processed so that the data is ultimately distributed to one or more instances of embodiments of the invention 240-B and a variety of other targets (collectively 999-B).

To fully understand the features, functionality, and operation afforded by various embodiments of the invention, a description of certain aspects are provided:

As represented in FIG. 14, one embodiment of the invention is based on the notion of the flows of data through a variety of layers—each layer being responsible for a discrete function of the overall invention. These layers work in concert to deliver a data flow from sources to targets (999-A/240-A and 999-B/240-B respectively). It is noted that an embodiment of the invention is itself recursive in nature, in that the output from an instance of the invention may be the input to another instance of the invention.

Embodiments of the invention are generally depicted by reference number 240 throughout the figures. Such embodiment(s) 240 can be implemented as software or other machine-readable instruction stored on a machine-readable medium. One or more processors can execute the software in order to perform the functionality described herein. As a non-limiting example, the software can be embodied as a module stored in memory of a sender device, a receiver device, a network device (such as a proxy device), and/or other device or combination thereof. In other examples, embodiment(s) 240 can be implemented in hardware and/or a combination of hardware and software. Where certain features or operations of the embodiment(s) are depicted in flowchart form, it is understood that elements of such flowcharts can be added, removed, modified, and/or combined, and that operations need not necessarily occur in the exact order shown.

Figure 15:
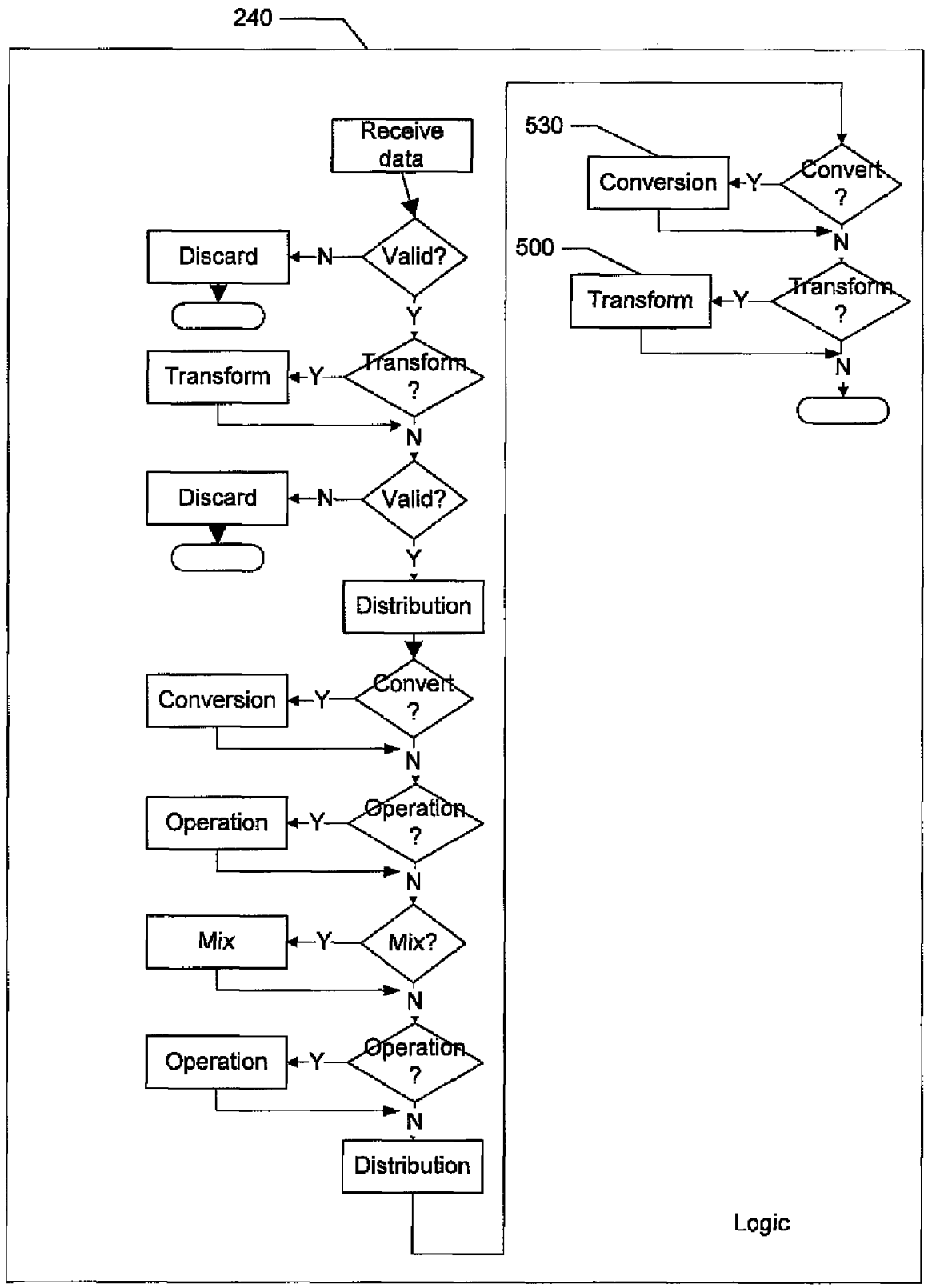
FIG. 15 is a flowchart representing example logic used to process data received from one or more instances of embodiments of the invention 240-A and a variety of other sources (collectively 999-A) so that the data is ultimately distributed to one or more instances of embodiments of the invention 240-B and a variety of other targets (collectively 999-B).

The flowchart in FIG. 15, which can be read in conjunction with FIG. 14, depicts the logic used to carry out the internal functions of the invention according to one embodiment 240. Specifically, the beginning of this flowchart represents data, upon being received into an embodiment of the invention's logic, being validated against a set of criteria specific to that data. For example: audio data is checked to confirm that such data is of a type that an embodiment of the invention can process. If the data is not valid, it is discarded.

Figure 16:
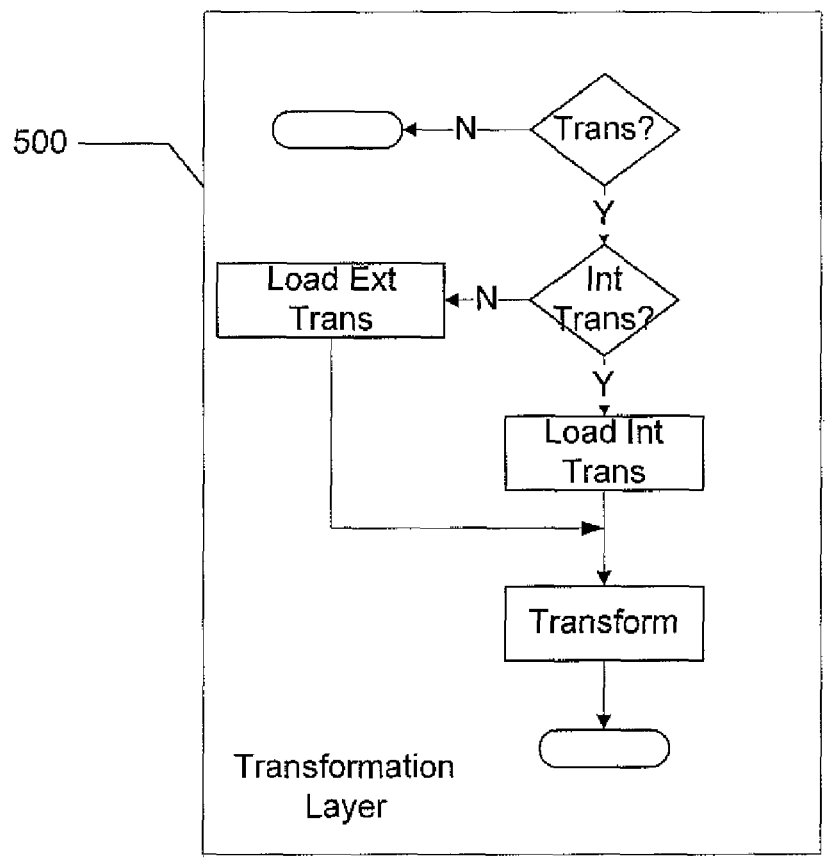
FIG. 16 is a flowchart representing example logic used by a transformation layer 500 to transform (such as encrypt or decrypt) data. Transformation is supported by the encryption of internal or external transformers, both of which are loaded on demand based on system configuration.

After validation, a determination is made whether data needs to be transformed (e.g., encrypted or decrypted) by a transformation layer 500. If so, the data is transformed by one embodiment of the invention according to the flowchart depicted in FIG. 16, which shows an embodiment of the invention determining whether the transformation logic (e.g., the encryptor or decryptor as appropriate the direction of the data flow) is an internal algorithm or one that should be loaded from an external location (e.g., the invention supports both internal and external transformation logic). Once that transformer is loaded, the data is transformed and the resultant returned to the high-level flow of the logic.

Once transformations have been made to the data, the next step in FIG. 15 is to verify whether the now-transformed data is still valid. If so, execution continues. If not, processing of the data unit ends.

Figure 17:
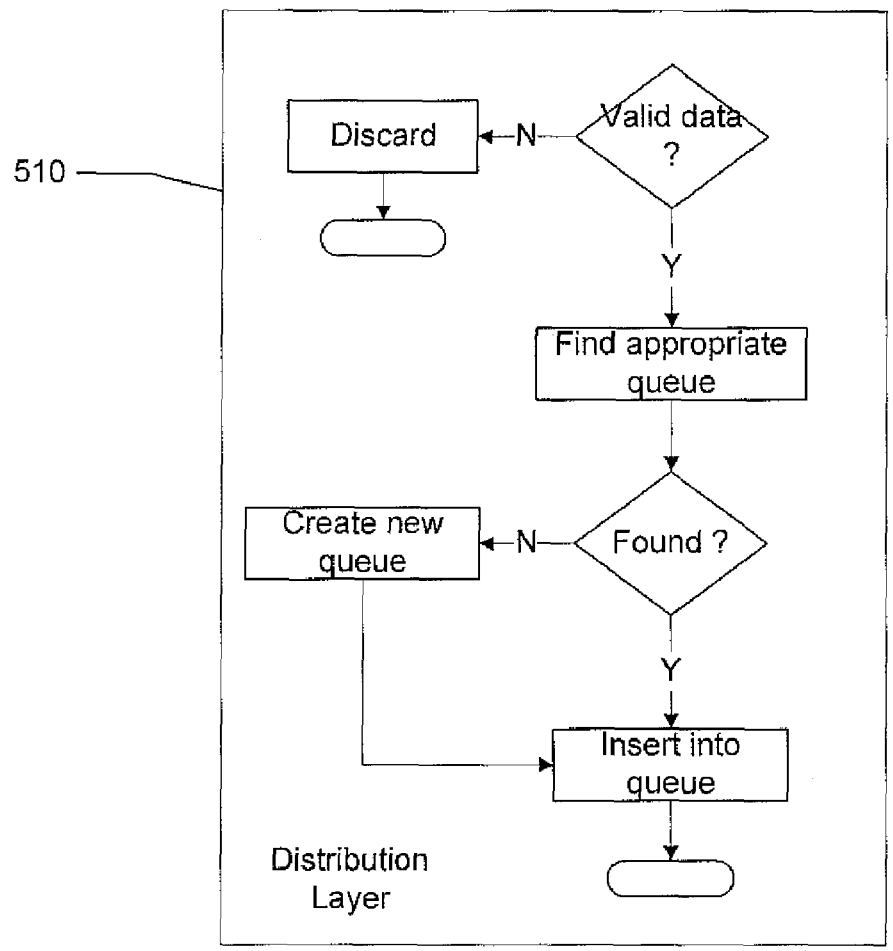
FIG. 17 is a flowchart representing example logic used by the distribution layer 510 to distribute data to appropriate queues 520.

After secondary validation, the next step in FIG. 15 is to distribute the data via a distribution layer 510 to queues 520 (see, e.g., FIG. 14) that hold the data for further processing by an embodiment of the invention. The logic used for the distributed is depicted in FIG. 17, where it is shown that one embodiment of the invention again determines whether the data is valid, and if so proceeds. The next step here is to determine whether a suitable queue exists for the data or whether a new queue is to be created. The factors influencing the determination of a suitable queue are various and include, but are not limited to, current time, time the data unit was transmitted, source address of the data, type of data, size of data, and the current length of possible suitable queues. Once a suitable queue has been located or a suitable one created, the data is inserted into the queue according to the logic depicted in FIG. 18.

Figure 18:
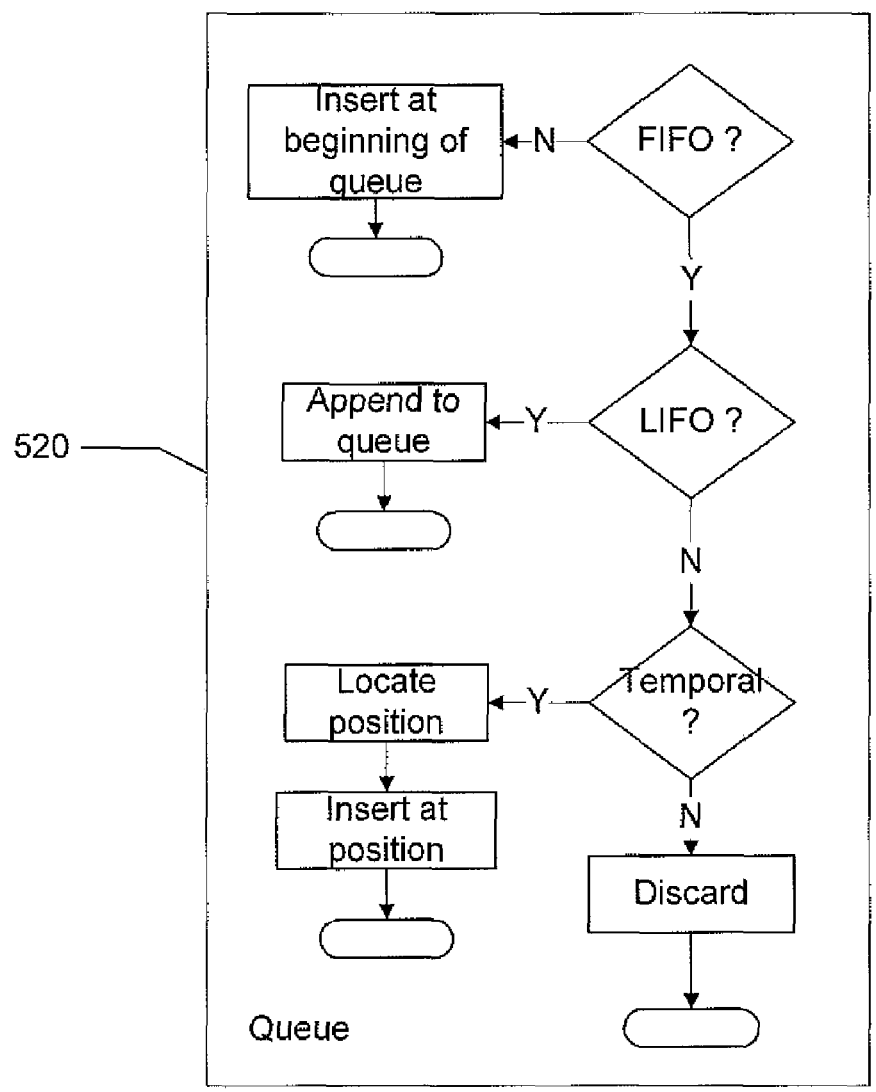
FIG. 18 is a high-level flowchart representing example logic used to implement a queue 520. Placement of the data in the queue is based on whether the queue is temporally relative (such as a "de-jitter" buffer used for audio and video queuing), a FIFO (First In First Out) queue, or a LIFO (Last In First Out) queue, for example.

FIG. 18 depicts the logic for data insertion into a queue 520 according to one embodiment. Such insertion is based on the type of queue being used and the nature of the data itself, for example. A first embodiment of the present invention allows for three queue types—"FIFO" (First In First Out), "LIFO" (Last In First Out), and "Temporal". A temporal queue is one that is typically used to queue real-time data such as audio or video transmitted across a medium (such as a computer data network) where on-time and in-sequence delivery of sequential data units (e.g., packets) are not guaranteed. Such queues are commonly referred to as "de-jitter" buffers. As shown in FIG. 18, data destined for a FIFO queue will be inserted at the front of the queue, while data destined for a LIFO queue will be appended to the end. Data destined for a temporal queue involves location of a suitable position within the queue at which the data is to be inserted. The criteria used for determining the correct position in the temporal queue is based on a variety of factors including, but not limited to, the current time, the time of data unit's transmission from its source, and the current size of the queue.

Returning to FIG. 15, the next step in the logic flow is to convert the data using a conversion layer 530. Such conversion is performed for those data units whose representation and processing by external entities is incompatible with the internal representation of that data inside the logic of an embodiment of the invention. For example: conversion is performed for audio data represented externally on a computer data network as ITU G.711 format. Such conversion is made to an embodiment of the invention's internal representation before operations can be carried out on it. Data whose format is compatible with an embodiment of the invention's internal logic need not be converted.

Figure 19:
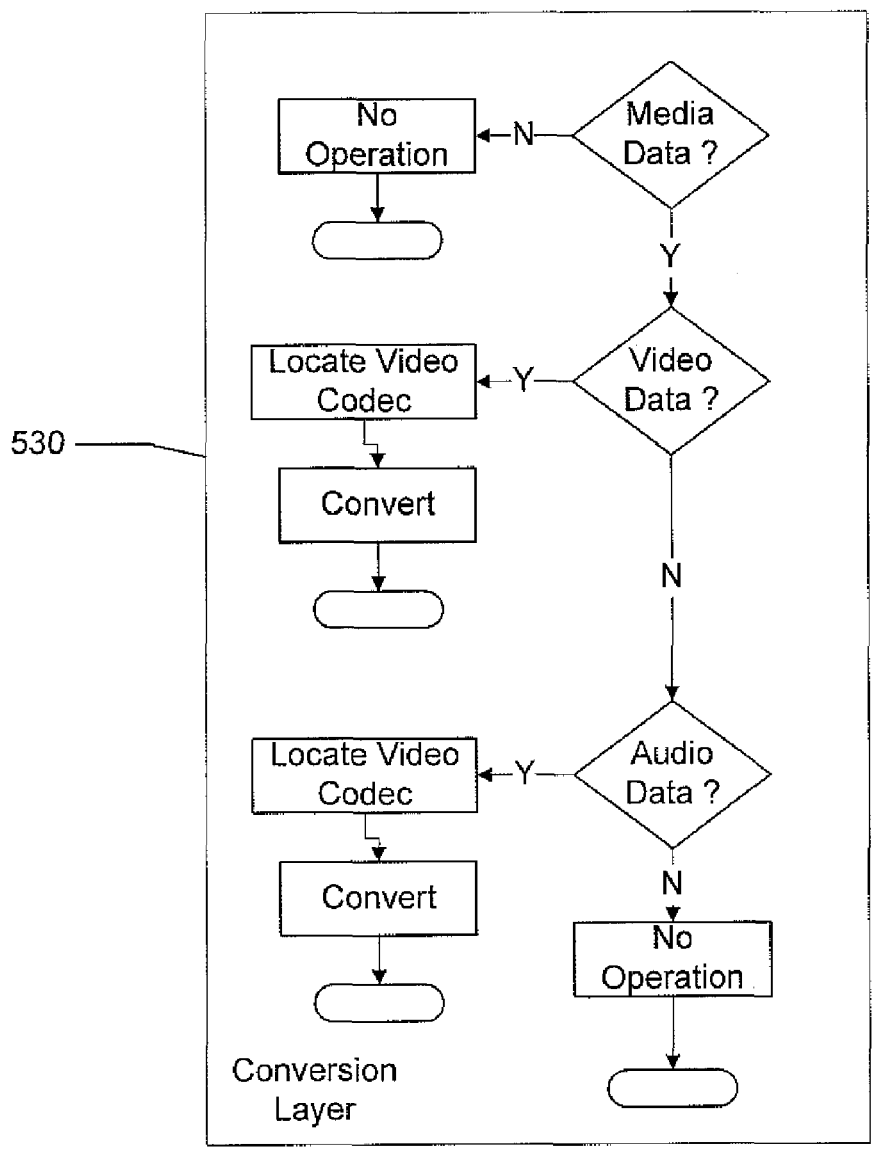
FIG. 19 is a flowchart representing example logic used by a conversion layer 530 to convert data packets into an appropriately common internal representation for use by an embodiment of the inventions' higher-level logic components or, inversely, to a format suitable for transmission to other endpoints in the invention. For example: conversion from audio or video packets on the network to a common internal format or, inversely, conversion from the common internal format to audio or video packets bound for the network.

FIG. 19 is a flowchart depicting the logic used to implement the conversion layer 530 according to an embodiment. Here, the flow depicts an up-front determination of whether the data is media (e.g., data that may need to be converted). If that media is in a video format, the appropriate video converter is loaded and the data converted. Similarly, if the data is audio, an appropriate audio converter is loaded and the data converted. If the data is media of a type that is not supported, the data unit is discarded. A typical embodiment of such a converter is a standard algorithm commonly referred to as a "CODEC," which is an acronym for "Coder Decoder"—being an algorithm used for compression and/or decompression of media data such as audio or video. Examples of standard CODECs include, but are not limited to, G.711, G.729, and GSM 6.10 for audio and H.263, H.264, and MPEG-2 for video.

The next step in FIG. 15 is that of operations carried out on the data by the operations layer 540. Such operations include, but are not limited to, media modification filters, real-time media tone insertion and removal, and real-time video picture insertion and removal, for example.

Figure 20:
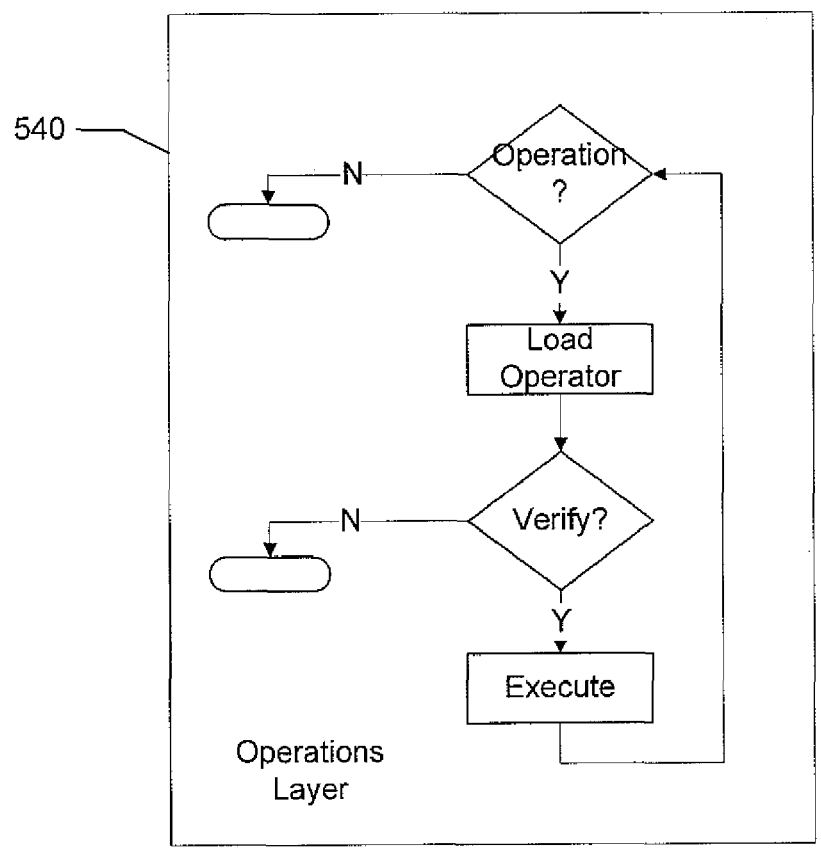
FIG. 20 is a flowchart representing example logic used by an operations layer 540 to carry out specialized operations on the data. Such operations include, but are not limited to, media modification filters, real-time media tone insertion and removal, and real-time video picture insertion and removal.

FIG. 20 is a flowchart depicting the logic used to implement the operations layer 540 according to an embodiment. Here, a determination is made whether an operation is to be carried out (e.g., applying of a real-time filter or insertion of an audio signal). Such operation may be included in an embodiment of the invention at the determination of a customer, developer, or implementer so as to satisfy a particular need. For example: an embodiment of the present invention supports the insertion of an audio signal into an audio stream so as to cause a $3^{rd}$-party device, such as a two-way radio system, to carry out an operation based on the frequency, duration, and amplitude of that audio signal inserted into the stream. Another embodiment of the present invention supports the real-time application of a filter to an audio stream so as to extract audio signals for purposes of detecting embedded data as well as clarify and enhance quality of the resultant audio data. Yet another embodiment of the present invention includes operations to clarify media data such as audio and video for purposes of enhancing the signal of such data so as to provide an enhanced user experience for users.

Once all appropriate operations have been carried out on the data by the operations layer 540, the next step in FIG. 15 is that of mixing of the data via a mixing layer 550. The mixing layer 550 is responsible for, where appropriate, combining media and data streams in such a way as to form entirely new streams or modify existing streams. For example: an embodiment of the present invention is that of the combination of a variety of audio streams—each from a different participant—in such a way that each participant will hear all other participants' voices except their own. This is known as an "N minus 1" mix—where "N" represents the sum of all audio streams entering a the core logic of the invention, and the "minus 1" portion refers to the subtraction of the current participant's stream from the stream returned to them. A simple example of such an "N minus 1" mix is the experience one has when participating on an ordinary telephone conference where you hear all participants' voice except your own.

A more general description of an "N minus 1" mix is an "N minus x" mix where the "N" portion is still the sum of all inputs as described above while the "minus x" portion refers to the subtraction of a selection of one or more inputs from the interim resultant so as to create a final resultant that satisfies the needs of a particular configuration required by a user or administrator of an embodiment of the invention. In one example, embodiment N comprises the sum of pulse code modulation (PCM) samples from each participant's audio (or other signal), and therefore, the N minus x quantity represents the sum of all of their PCM samples minus the PCM samples of the participant(s) that are to be excluded. The resultant N minus x frame therefore comprises the resultant N minus x values ("mix") over a period of time.

Figure 21:
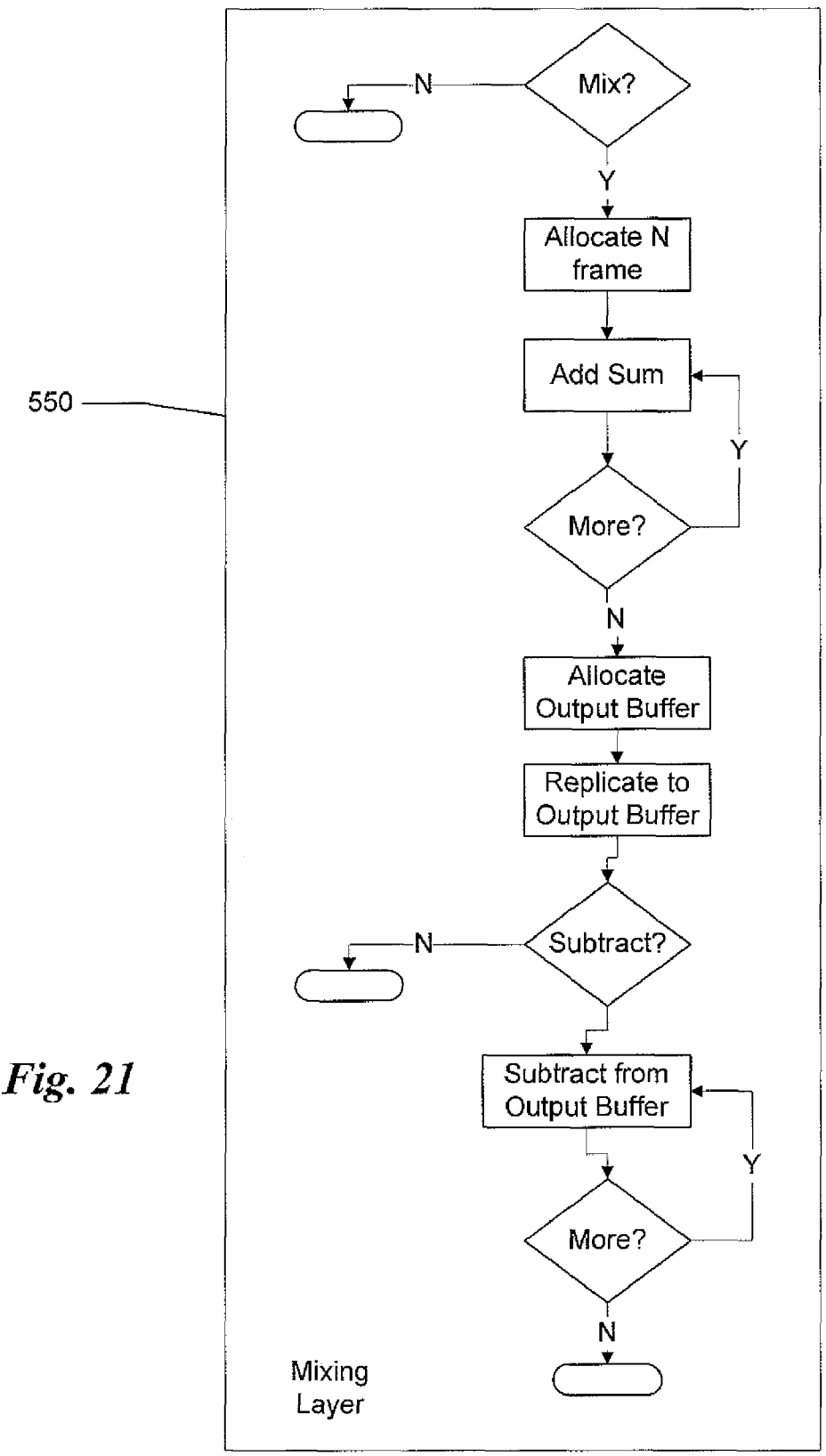
FIG. 21 is a flowchart representing example logic used by a mixing layer 550 to, within a particular "time-envelope", combine media frames from one or more input sources into a single "N" (i.e., fully mixed) frame. Optionally, subtraction operations are performed on the resultant frame to extract specific frames in order to create "N minus 1" or more commonly "N minus x" output frames.

As shown by the embodiment of the mixing layer 550 illustrated in FIG. 21, the mixing logic first determines whether a mix should, in fact, be carried out on the data. Such determination is based on a number of factors including, but not limited to, whether the data can actually be mixed, or whether a mix is required at all. If a mix is required, an embodiment of the invention's logic next allocates a blank "frame" which serves as a temporary storage area for the "N" frame. To this "N" frame, all input frames within the current time-envelope are added to create a combination of all inputs—i.e., a "full" mix. After this step, the logic allocates an output storage area, which contains a number of frames that match the output requirements of the mixing operation. The "N" frame is replicated across this storage area so as to fill each frame in the output storage area with a copy of the "N" frame.

The next step in the mixing operation is that of determining whether a subtraction is to be performed from the frames in the output storage area. If such subtraction is required by the parameters for the mixing operation, the logic of one embodiment of the invention will sequentially and repetitively subtract from each output frame the input frames that match the subtraction parameters provided. In doing so, the final resultant frames in the output storage area will contain only the data which is destined for an eventual output participant of the overall logic of the embodiment of the invention.

Once the mixing layer 550 has completed its operation, the next step depicted in FIG. 15 is that of operations 540 as described above. The flowchart in FIG. 20 and described above carries out the relevant operations on the data at this point.

Once operations are completed, the next step in FIG. 15 is that of distribution via the distribution layer 510 to queues 520. Such operation is depicted in flowchart form in FIG. 17 and FIG. 18 and described above.

After distribution is completed, another conversion operation 530 is completed—this time converting the data from an embodiment of the invention's internal representation to a format compatible with that of the target of the transmission of the data. For example: for communication of audio data across a computer data network to a remote endpoint, one embodiment of the invention would convert the audio data from its internal representation to a format recognizable by the remote endpoint and compatible with the transport mechanisms of said computer data network. The logic employed by the conversion layer 530 at this point is described by the flowchart in FIG. 19.

After conversion, the step before transmission of the data to the target is that of transformation handled by the transformation layer 500. In the same way in which incoming data is transformed by the transformation layer 500 as described above and depicted as a flowchart in FIG. 16, the data is transformed by the transformation layer 500 so as to satisfy the needs of security of the data being transmitted across a medium, such as a computer data network.

Once data has been processed by the core logic described above, it is made available to various participants in a format and medium supported by those participants. Such medium, when implemented on a computer data network, is represented by the abstract notion of channels described above.

Figure 2:
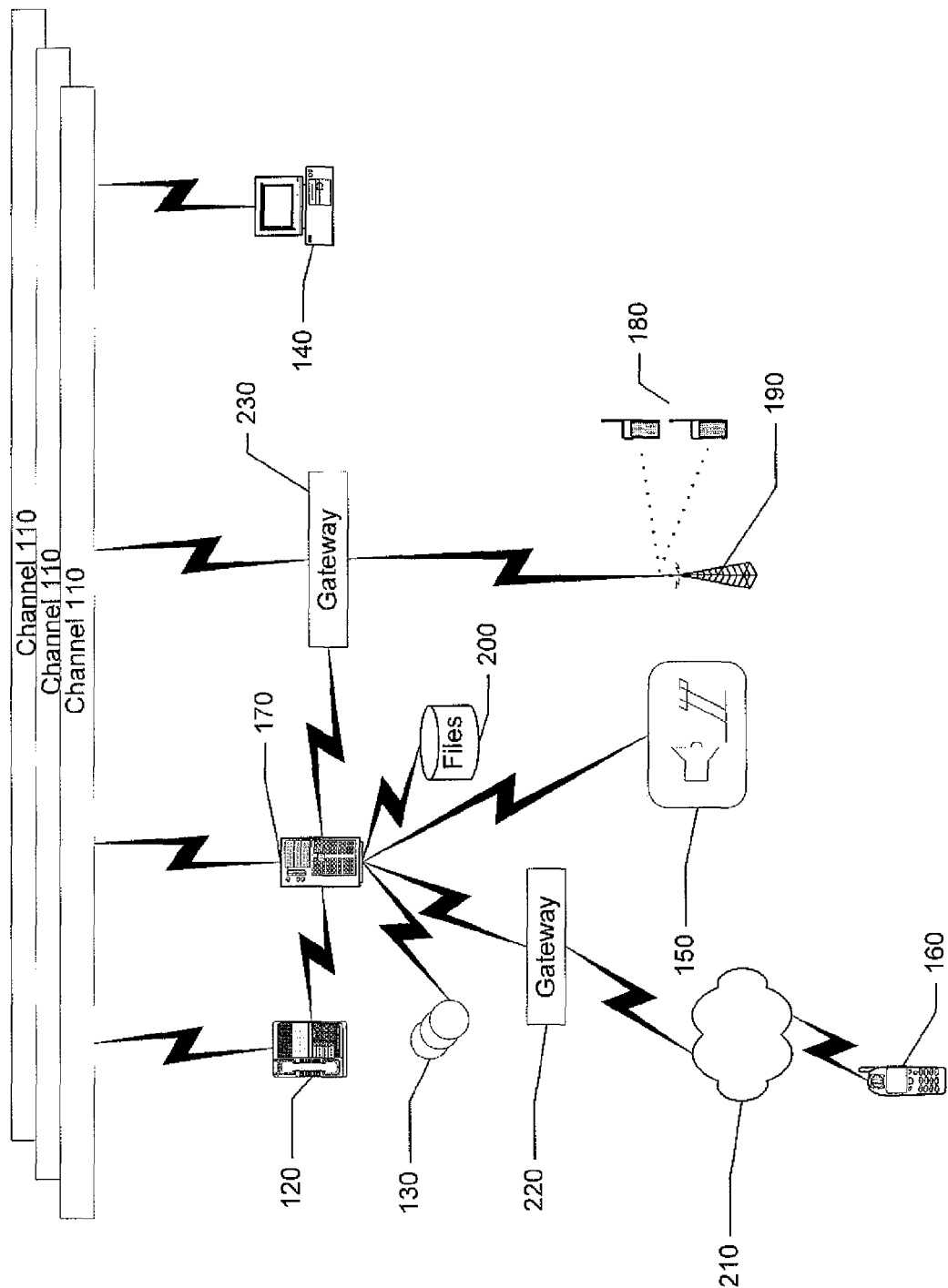
FIG. 2 is a logical system block diagram, in accordance with one embodiment, showing connectivity from a variety of endpoint devices to a one or more channels of communication 110 shared by said devices.
Figure 3:
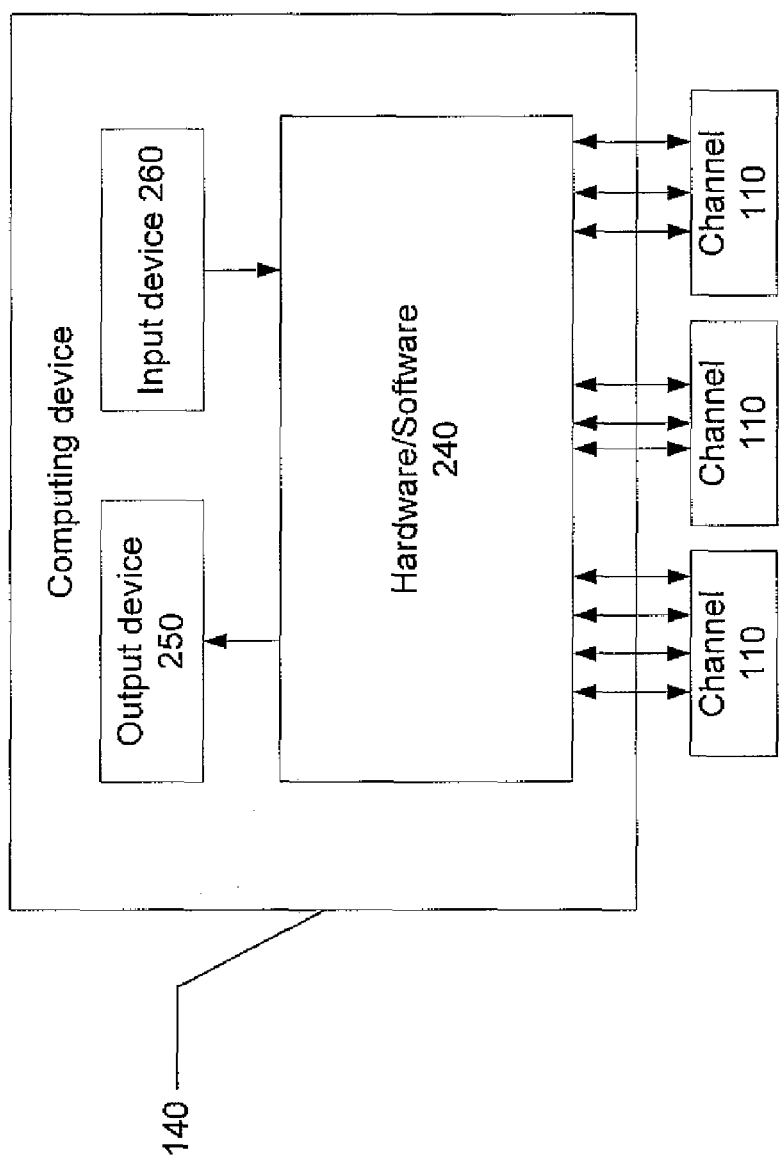
FIG. 3 is a logical block diagram showing example connectivity between an embodiment of the invention residing on a computing device 140 (or other device) and one or more channels 110. Also shown are audio input and output devices 260 and 250 respectively which serve as sources and targets of audio on the computing device.

FIGS. 1-2 illustrate the manner in which a variety of disparate communication devices (e.g., endpoints) can communicate with each other using one or more virtual channels 110. In an embodiment, any one of the communication devices can access a particular virtual channel 110 by tuning into an appropriate IP multicast session carried on that virtual channel. Non-exhaustive and non-limiting examples of the communication devices are described below and elsewhere throughout this specification. The manner of participation on channels 110 by a particular one or more endpoint type is described below by way of various non-limiting and non-exhaustive examples—it is appreciated that while these discrete examples are set forth using various network architectures, such examples can be combined to provide yet other embodiments with different architectures, devices, configurations, and the like:

End-User Computing Devices—FIG. 3: In this case, an embodiment of the invention 240 on an end-user computing device 140 allows the user to monitor multiple channels 110 simultaneously and direct the media received from any of those channels to one or more rendering systems 250 (such as speakers or a computer display) connected to the computing device 140 on a channel-by-channel basis. Similarly, the user can select media input devices 260 of preference on a channel-by-channel basis to be used for speaking or transmitting other types of media such as video onto those channels. Such input devices include, but are not limited to, microphones, video cameras, and media files.

While media is generally received and transmitted using multicast technologies described above, another embodiment of the invention also caters for unicast receive and/or transmit based on the requirements of the specific channel, user, or application.

When communication from a computing device endpoint is ultimately destined for a specialized communication system, one embodiment of the invention allows for the configuration of arbitrated communications wherein the number of transmitters is limited to allow for the communication protocol and etiquette of the far-end. For example: In the case of an end-user using a computing device endpoint to communicate with a "talk group" on a two-way radio system, the channel the user is speaking on may be configured to allow only a single speaker at a time so as to enforce the etiquette of the far-end two-way radio system—where people generally take turns in speaking rather than the "free-for-all" nature of an intercom or traditional telephone-based conferences.

One embodiment of the invention's use in the form of an end-user application is not its only implementation. Another embodiment of the invention is also used on non-user computing devices such as server computers and specialized appliances. In either case (end-user or otherwise), the same functionality afforded by the invention to one implementation is afforded the other.

Figure 4:
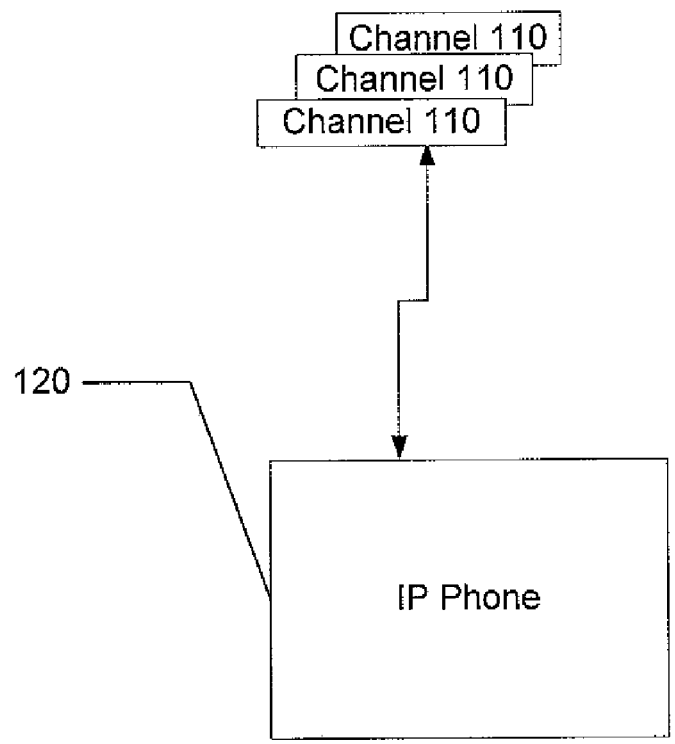
FIG. 4 is a logical block diagram showing, in accordance with one embodiment, connectivity between an IP telephone 120 capable of direct communication with one or more channels 110.

IP Telephones (Fully Channel-Capable)—FIG. 4: In this scenario, IP phones 120 generally obtain channel configuration (such as multicast IP addresses and port numbers) from a management system which delivers that configuration in a format compatible with that particular brand of IP telephone.

IP phones that have full support for the invention's channels can receive and transmit directly onto the multicast and unicast groups on virtual channels 110.

Figure 5:
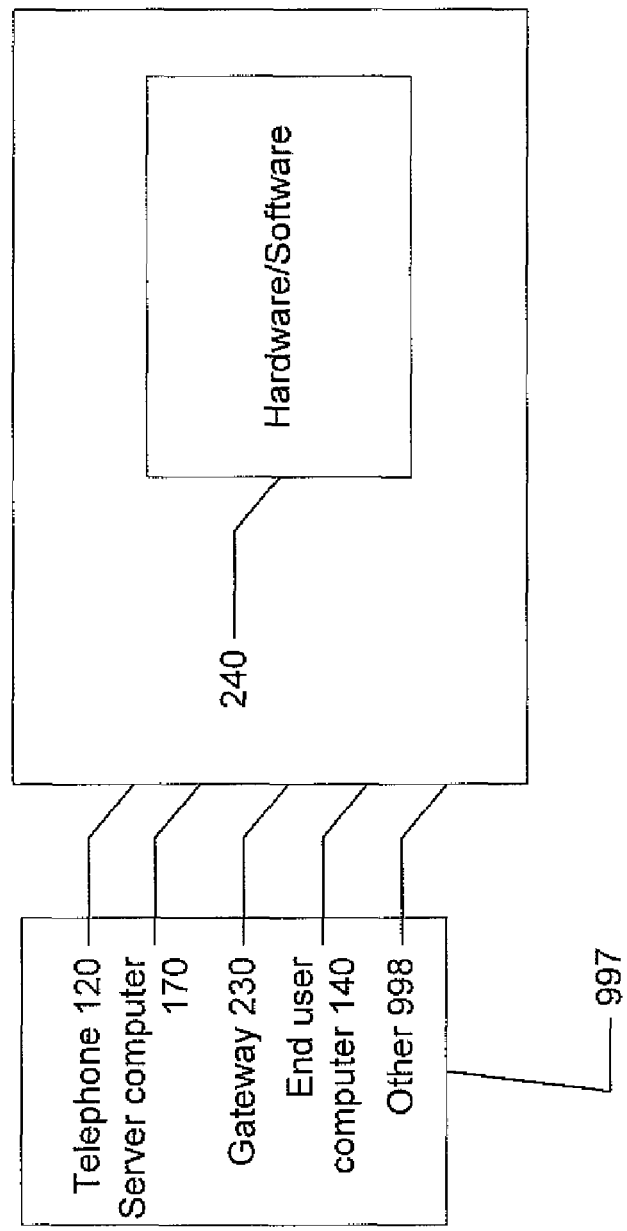
FIG. 5 is a logical block diagram showing an embodiment of the invention 240 resident on a computing device 120, or 170, or 230, or 140, or any other suitable computing platform 998—collectively referred to as 997—capable of housing and executing the logic of the invention.

Resident on Computing Device—FIG. 5: Shown here is an example incorporation of an embodiment of the invention on a computing device such as a telephone 120, server computer 170, gateway 230, end user computer or PDA 140, or any other or any other suitable computing platform 998—collectively referred to as 997—capable of housing and executing the logic of the invention. Such incorporation may take the form of software loaded onto the device, firmware incorporated into the microcode of the device, hardware circuitry designed to conform to the design of the invention, or any other suitable form of instruction or design capable of executing the logic of the invention.

Figure 6:
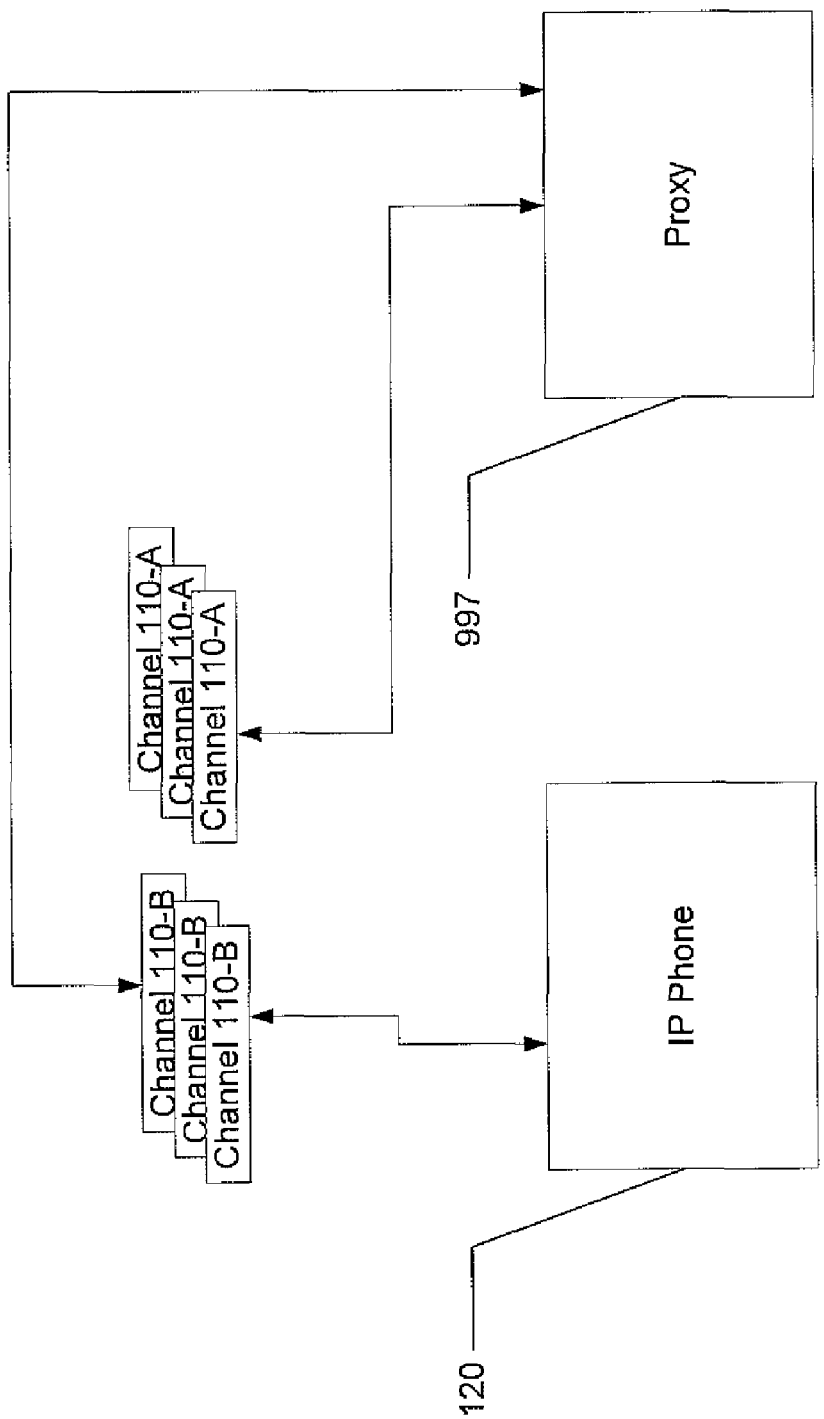
FIG. 6 is a logical block diagram showing an example in which an embodiment of the invention on a device 997 is utilized to provide mixing and transcoding services on behalf of the IP telephone 120. The IP telephone 120 receives and transmits audio to one or more channels 110-B, and the device 997 receives and transmit audio between one or more channels 110-B and one or more channels 110-A.

IP Telephones (Partially Channel-Capable)—FIG. 6: Similar to the scenario described in FIG. 4, IP phones 120 in this scenario obtain channel configuration (such as multicast IP addresses and port numbers) from a management system which delivers that configuration in a format compatible with that particular brand of IP telephone.

The difference between the scenario described in FIG. 4 and that of FIG. 6 is that IP phones in FIG. 6 do not have full support for channels as described by the invention—e.g., they may not be able to process multiple data sources or multiple codecs simultaneously but are capable of partial processing of channel-based data.

To address this issue, an implementation allows for an embodiment of the invention residing on a device 997 as a proxy resource to bi-directionally propagate data from a channel 100-A to a channel 100-B accessed by the IP phone 120.

The proxy resource performs the appropriate mixing and, where necessary, data conversion to deliver data to the channel accessed by the IP phones. Similarly, data received via the channel 100-B from the IP phone 120 is mixed and transcoded so as to convert that data to a format suitable for the target channel.

Figure 7:
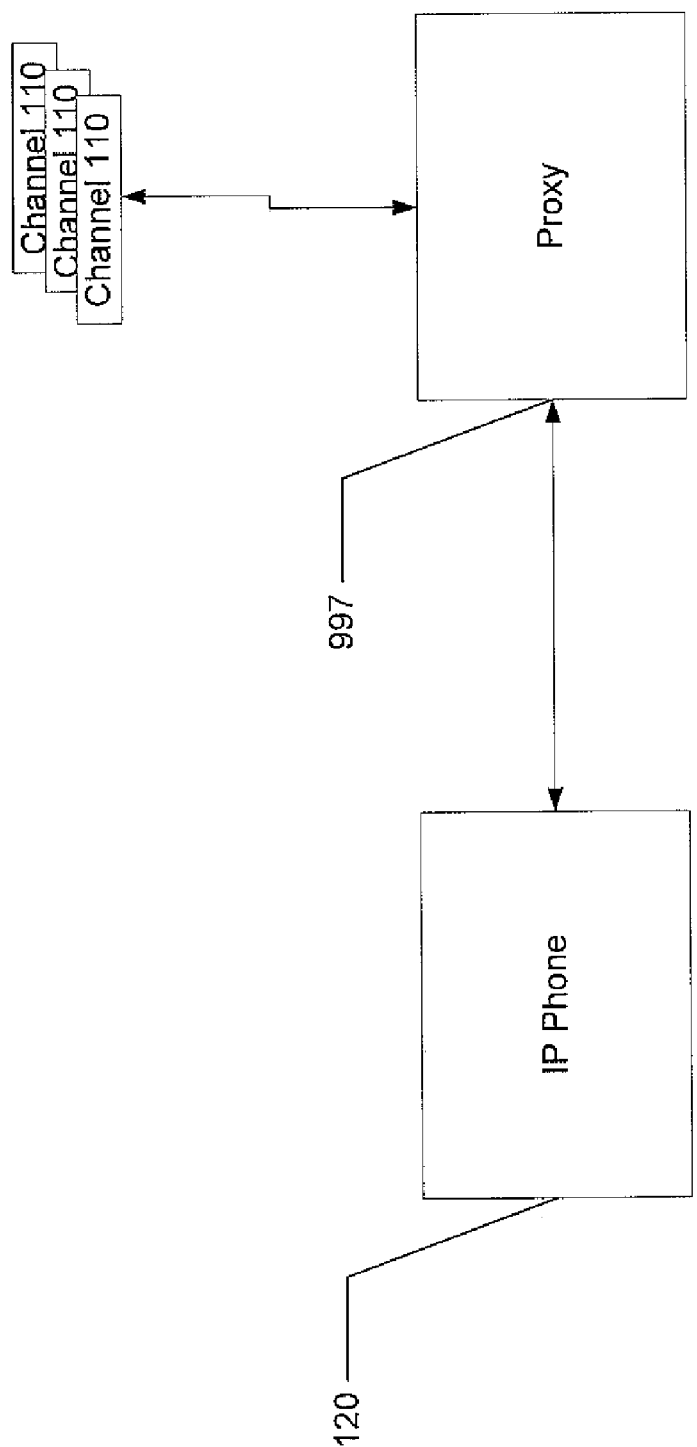
FIG. 7 is a logical block diagram showing example connectivity between an IP telephone 120 establishing a call to an embodiment of the invention on a device 997, which proxies audio to and from one or more channels 110 on behalf of the telephone.

IP Telephones (Via Dial-In or Dial-Out)—FIG. 7: IP telephones 120 in the form of specialized hardware devices and so-called "softphones" (software applications that emulate an IP telephone's functions) participate on channels by dialing into conference "sessions" hosted on one or more devices 997 employing the logic described by an embodiment of the invention. These sessions serve to bridge calls into those sessions onto the channels 110 by implementing "N minus x" mixing algorithms on all calls in the session as well as the aggregate of data received from multicast or unicast channels. In other words, data received from a call is propagated to all other calls in the session as well as to the channel. Similarly, data received from the channel is propagated to all calls in the session. Calls into the session are processed using industry standard protocols including, but not limited to, H.323, SIP, and MGCP. When operated in reverse, the call is established from the session to the IP telephone in accordance with dialing rules established by the administrative user.

Figure 8:
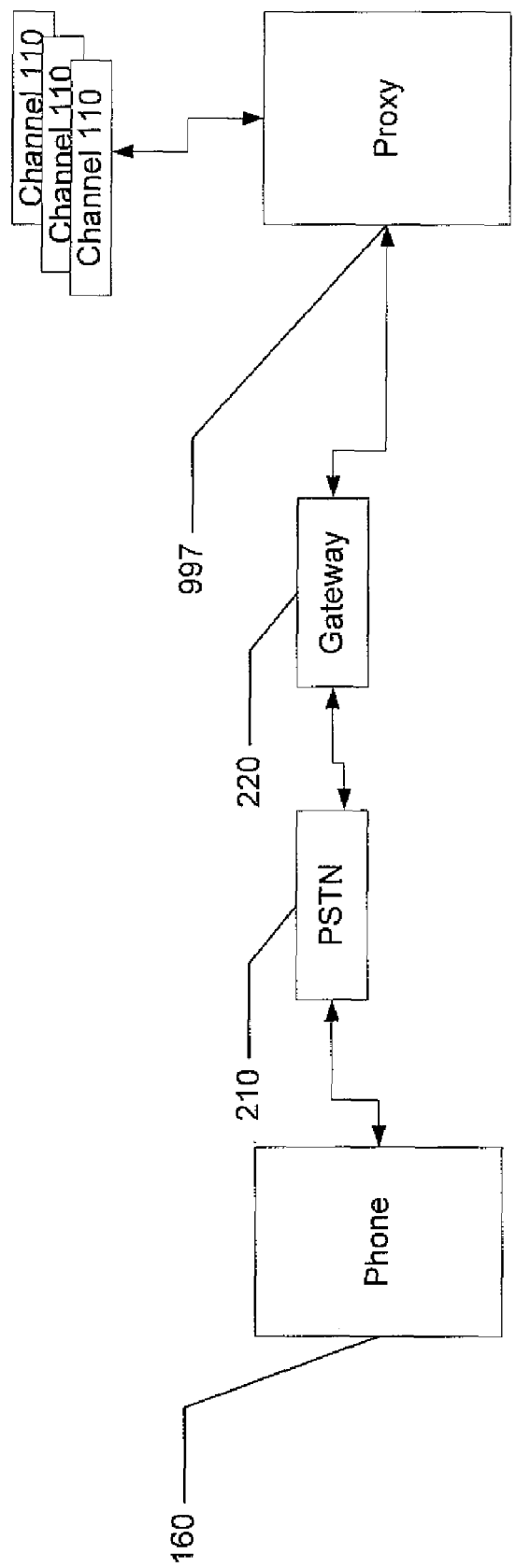
FIG. 8 is a logical block diagram showing example connectivity between a digital, analog, or cellular telephone (collectively 160) establishing a call to an embodiment of the invention on a device 997, which proxies audio to and from one or more channels 110 on behalf of the telephone 160. Conversion between the signaling and audio network 210 supported by the telephone 160 is handled by a gateway device 220 connected over a computer data network to the device 997.

Digital, Analog, and Cellular Phones—FIG. 8: These devices 160 participate on channels in much the same way that IP phones do—by dialing into a proxy 997 which proxies data to the channel 110 using techniques in accordance with embodiments described herein. In order to convert between the digital or analog telephone network 210 that these phones are connected to, a device known as a "gateway" 220 is brought into play to serve as a bridge between a PBX, key system, the Public Switched Telephone Network ("PSTN"), other or telephone signaling system (together 210). In response to an incoming call from such a phone, the gateway 220 establishes, or utilizes an existing call to the session using standard protocols such as, but not limited to, H.323, SIP, or MGCP. Upon receiving the call (now established using the protocols mentioned), the session treats the call as if it came from an IP phone or softphone as described above. When operated in reverse, the call is established from the session to the telephone device 160 in accordance with dialing rules established by the administrative user.

Gateway devices include, but are not limited to, server computers outfitted with the requisite hardware and software to handle call signaling, off-the-shelf gateway appliances such as Cisco routers including the 1700, 1800, 2600, 2800, and 3700 series routers, Multitech MVP-series gateways, Vega 10, 50, 100, and 400 series gateways, and custom-built computers including single-board machines and custom-designed computer circuitry.

Figure 9:
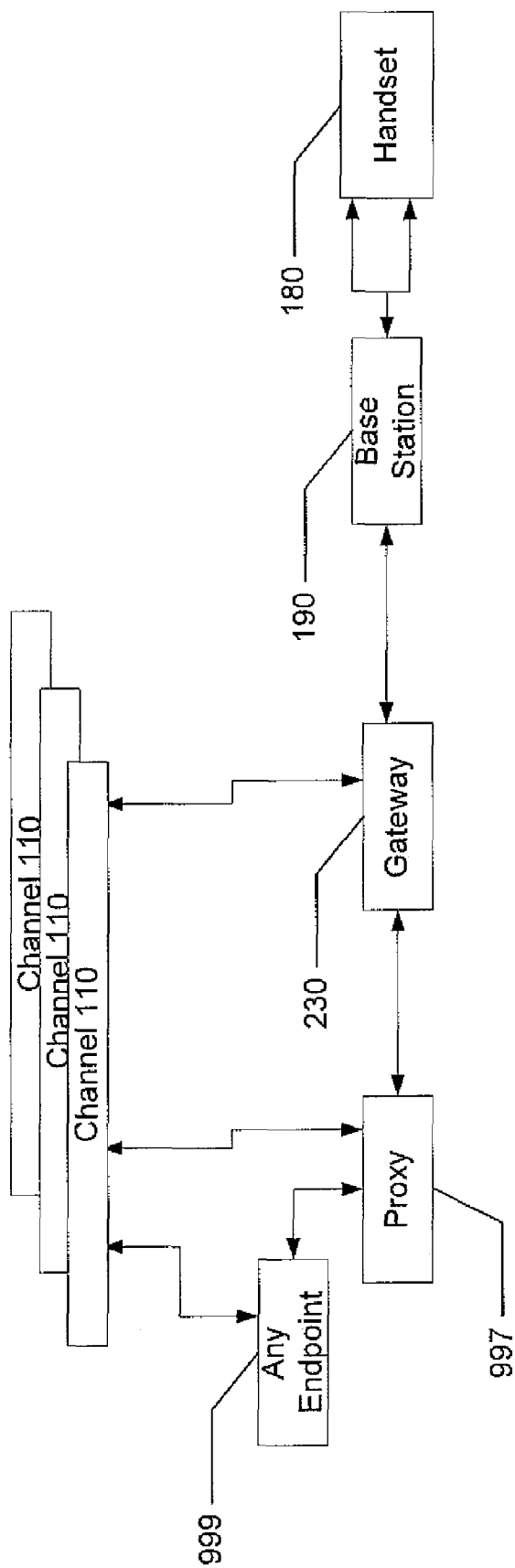
FIG. 9 is a logical block diagram showing example connectivity between one or more channels 110 and a variety of other endpoints 999 connected via an embodiment of the invention on a device 997 to a two-way radio system (collectively 190 and 180). The device 997 is connected to the two-way radio system via a gateway device 230.

Two-Way Radio Systems—FIG. 9: Participation on a channel 110 by a two-way radio system (collectively 190 and 180) is accomplished by using a gateway device 230 to convert analog or digital data received from a two-way radio interface device 190 into a data stream transmitted over the computer data network or other suitable transport mechanism. This stream, when transmitted by the gateway device 230 onto the medium, is treated by an embodiment of the invention as one of its own streams of data (i.e., a channel) and is therefore processed as if it came from one of its own, native, endpoints. In those circumstances where the gateway device 230 does not have suitable support for the channels, an embodiment of the invention may be installed on the gateway device 230 so as to add the logic so as to enable the gateway device 230 to communicate directly on the channels.

Implementation of the stream is not limited to unicast or multicast technologies. Another embodiment of the invention allows for the stream to be established as part of a signaled call using a standard or proprietary protocol such as H.323, SIP, MGCP, or any other call signaling protocol common to a device implementing a dial-in or dial-out embodiment of the invention residing on a proxy device 997 and the gateway device 230. The gateway device may establish the call to the proxy device 997 or the proxy may place a call to the gateway device 230. Either way, the end result is that a communication pathway is ultimately established between the proxy device 997 and the gateway 230 and the data stream can flow in one or both directions.

Data transmitted directly or indirectly to the stream by any other endpoint 999 in the system is relayed to the two-way radio interface device 190 by the gateway device 230. At this point, logic is employed by an embodiment of the invention to relay instructions to the two-way radio interface device 190 to transmit the received data onto the airwaves. This is accomplished through a variety of means including, but not limited to, the real-time generation of a sequence of specific audio tones embedded into the data stream, on behalf of instructions delivered to the gateway device 230 from the proxy device 997, or by digital, analog, electrical, or mechanical signaling relayed to the two-way radio interface device by the gateway device. This "keying" of the radio causes the relayed data to be transmitted onto the airwaves and therefore propagate to subscriber devices such as portable two-way radios, base stations, consoles, repeaters, and all other devices capable of receiving the data stream over the airwaves (collectively 180).

The keying logic described above is initiated in a variety of fashions including, but not limited to, the transmitting endpoint 999 embedding tones or instructions in the data stream during transmission of the speaker's voice, the transmitting endpoint 999 sending an instruction to the proxy device 997 or the gateway device 230, by a proxy device 997 based on the detection of data on the transmission medium, or by an embodiment of the invention residing on another endpoint 999.

Whichever method most appropriate for keying of a specific two-way radio is selected by the administrative user when configuring the system. Endpoints participating in conversations with the two-way radio are either directly aware that they are ultimately transmitting to a two-way radio system and therefore take specific actions to key the two-way radio. For those endpoints that have little intelligence of their own (such as a telephone); a proxy device 997 containing an embodiment of the invention assumes the task of providing the necessary logic to determine when the two-way radio should be keyed.

In the same way that instructions are passed to a two-way radio when transmitting data, similar instructions may also be relayed to the two-way radio to perform other tasks. These include changing frequencies and talk groups on the two-way radio, switching between high and low power transmission levels, selecting individual or groups of repeaters, and so forth. These instructions again take the form of sequences of audio tones or data instructions transmitted to the two-way radio via the gateway device 997 or by the gateway device itself signaling the two-way radio using analog, digital, electrical, or mechanical means.

Figure 10:
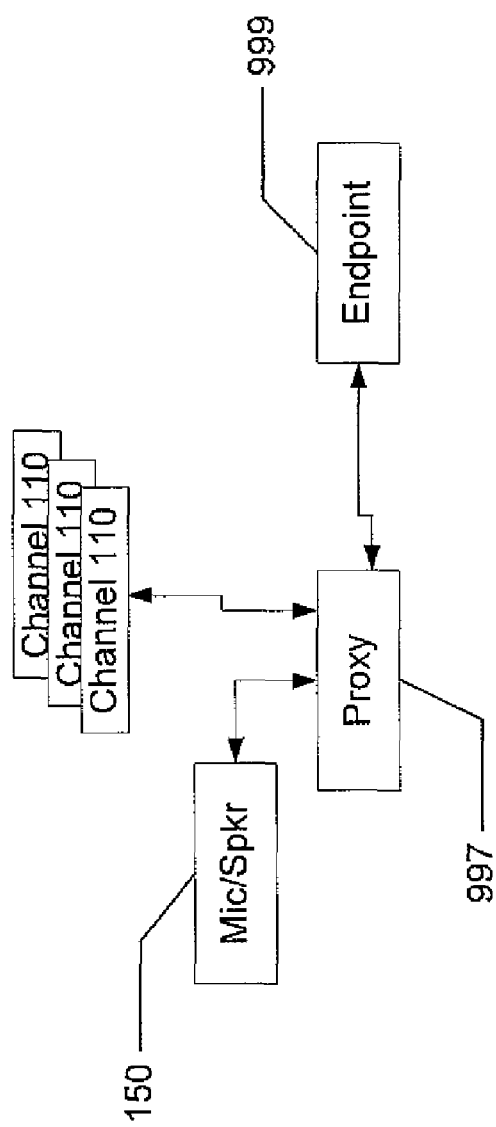
FIG. 10 is a logical block diagram showing example connectivity between audio input and output devices 150 and an embodiment of the invention on a device 997, which serves to bi-directionally proxy audio to one or more channels 110 and a variety of other endpoints 999.

Microphone and Speaker Devices—FIG. 10: These types of devices are bridged onto channels by an embodiment of the invention residing on a device 997. In this case, the proxy interfaces with audio hardware and software (collectively 150) connected to the computing device where the embodiment is located, propagating audio data to and from those devices as required by the configuration of the embodiment—such as to channels 110 and other endpoints 999.

Figure 11:
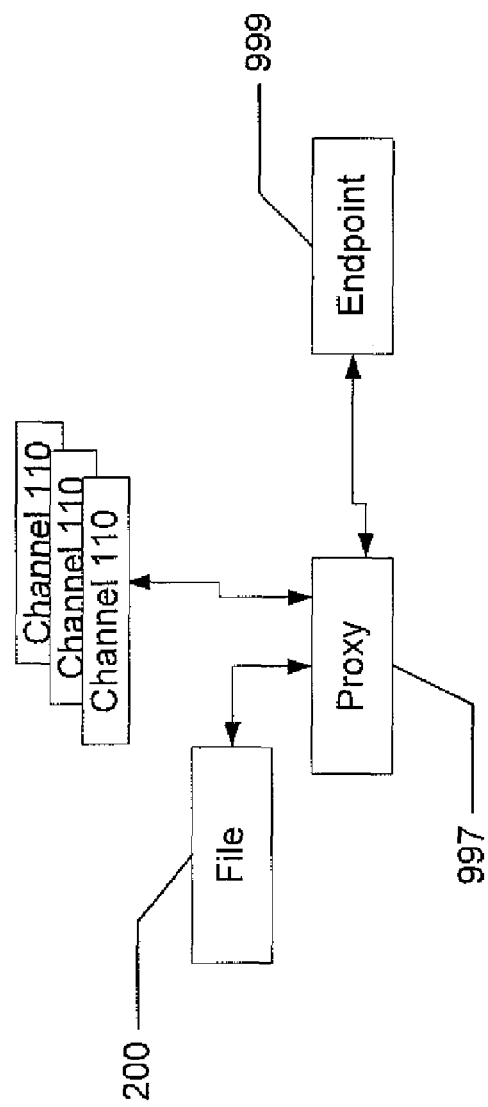
FIG. 11 is a logical block diagram showing example connectivity between computer data files 200 and an embodiment of the invention on a device 997, which serves to bi-directionally proxy audio to one or more channels 110 and a variety of other endpoints 999.

Computer Data Files—FIG. 11: Computer files are bridged onto channels again by an embodiment of the invention residing on a device 997. In this particular case, the embodiment can be configured to read data from a file 200, decode it as necessary to an internal format, and then propagate the resultant data to the channel 110 in a format suited to that channel. When operated in reverse, data received from a channel is written to a file in a variety of formats (i.e., "recording"). Once the recording operation is completed—indicated by, but not limited to, a fixed time expiring or lack of activity on the channel, the file is closed and propagated to one or storage systems for later retrieval by users, administrators, and others requiring access to those recordings.

Similarly, data is propagated to other endpoints 999 by the configuration determined by the administrative user.

Figure 12:
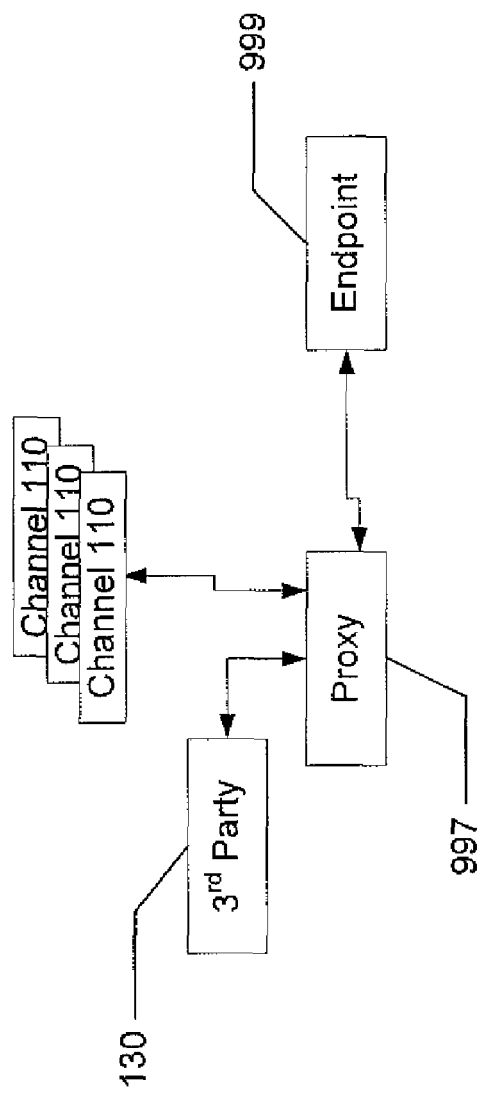
FIG. 12 is a logical block diagram showing example connectivity between one or more $3^{rd}$-party streams 130 and an embodiment of the invention on a device 997, which serves to bi-directionally proxy audio to one or more channels 110 and a variety of other endpoints 999.

$3^{rd}$-Party Streams—FIG. 12: These types of streams 130 are received by an embodiment of the invention residing on a device 997 and processed according to the format and structure of those streams. Pertinent information, such as audio, video, and binary or textual data, is extracted from those streams in real-time and propagated to channels 110 and other endpoints 999 in accordance with configuration settings established by the system administrator. When used in reverse, data from channels is propagated to the real-time stream—again in accordance with the format and specifications of that stream.

Figure 13:
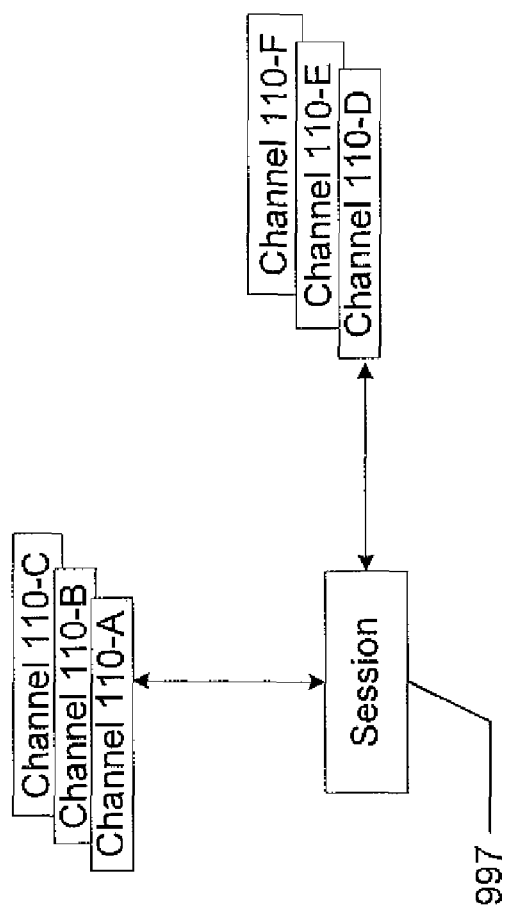
FIG. 13 is logical block diagram depicting an embodiment of the invention on a device 997 bridging one or more channels (110-A, 110-B, 110-C) with one or more other channels (110-D, 110-E, 110-F) so as to cause data to flow between said channels.

Channel-to-Channel Bridging—FIG. 13: Bridging between channels by a proxy device 997 containing an embodiment of the invention accomplishes a wide range of functionality. For example, such bridging can allow different "talk groups" on two-way radio systems to communicate between each other—for example a UHF two-way radio system on one channel and a VHF two-way radio system on the other. Another example is the ability to bridge channels managed by different entities—such as different law-enforcement agencies—together in such a way so that end-users within those entities are able to communicate with each other—no matter the type of equipment they use. The fact that an embodiment of the invention makes use of a computer data network to perform such functions makes it possible for communications to not only cross jurisdictional, political, operational, and technical boundaries; it also allows for communications to cross geographical boundaries that were previously difficult of impossible to cross—such as limited power two-way radio communications across mountain ranges, across oceans, etc.

The flow may be of numerous, and potentially recursive, combinations of the channels' participation in the operation being carried out on the device 997 including, but not limited to, direct channel-to-channel streaming, aggregation of data from one or more channels to one or more channels, conversion of data from one or more channels to one or more channels, translation of data from one or more channels to one or more channels, or any inclusive or exclusive combination thereof.

Figure 22:
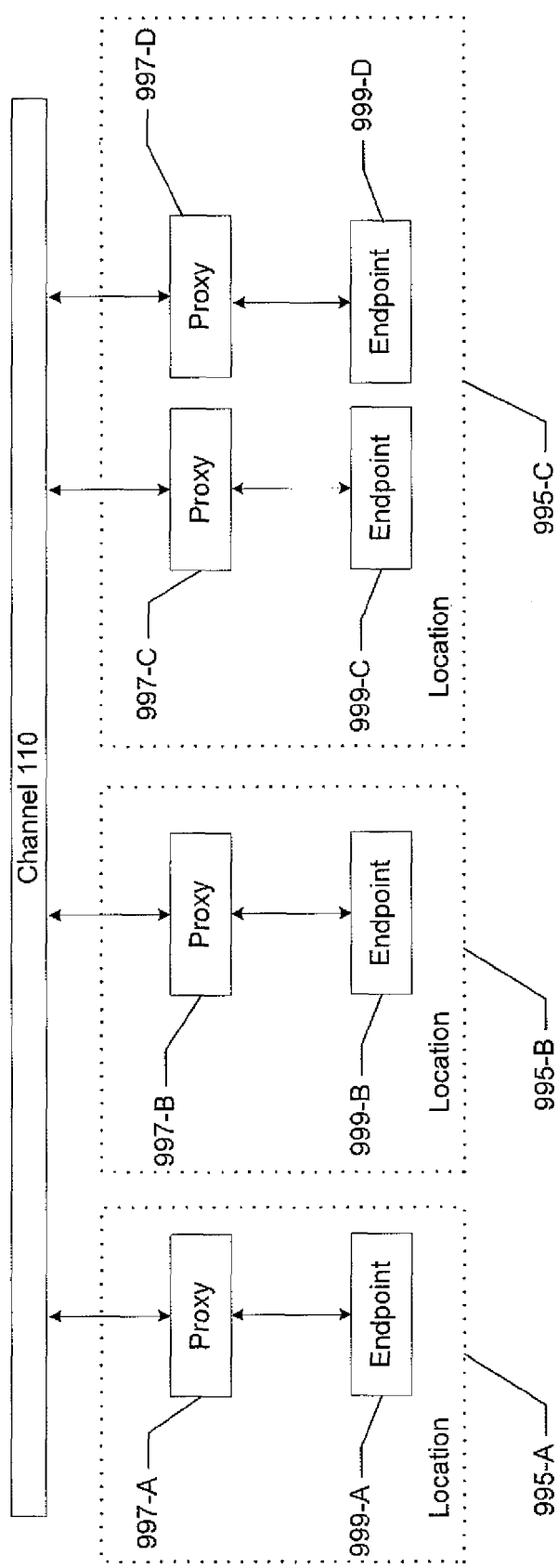
FIG. 22 is a logical block diagram showing example connectivity between various endpoint types (999-A, 999-B, 999-C, 999-D) and a channel 110 via multiple proxies (997-A, 997-B, 997-C, 997-D) in multiple physical locations (995-A, 995-B, 995-C) so as to create a conference distributed across multiple devices while allowing endpoints connected to dissimilar proxies to communicate with each other indirectly via channel 110.

Distributed Conferencing—FIG. 22: In this example architecture, embodiments of the invention residing on multiple proxies 997-A, 997-B, 997-C, and 997-D in multiple locations 995-A, 995-B, and 995-C are used to create distributed conference calls between a variety of endpoints 999-A, 999-B, 999-C, 999-D using channel 110 as a backbone of interconnectivity. In this example, an endpoint (for example a telephone user) may call into any one of the proxies and speak with other participants connected to the same proxy, or to other proxies. For example, callers in the New York location (e.g., 995-A) would call into a proxy in New York (997-A) while callers in London (e.g., 995-B) would call into the proxy in London (997-B) and callers in the Tokyo facility (e.g., 995-C) would call into either of the proxies in Tokyo (997-C and 997-D). Even though individuals in each of the locations are connected to their own local proxies, their voices would be heard not only by other participants connected to the same proxy, but also by all other participants in all other locations due to the use of a multicast channel 110 added to the conference by each of the proxies. It is noted that in the example, the channel 110 is not of a point-to-point nature (although such configuration is supported) but is of a multicast nature (i.e., there is no point-to-point connectivity between the proxies). This means that the individual proxies need not be aware of other proxies on the channel.

This anonymous method of interconnectivity between proxies addresses issues in enterprise and mission-critical conferencing—that of scalability, reliability and failover, and cost savings. In the example, a customer utilizing such a configuration would realize significant cost savings by not paying for international calling between the three example cities. Furthermore, should a proxy at a location fail, a secondary or tertiary proxy at the same location can take over automatically. Furthermore, scalability is practically unlimited as one is no longer limited by the processing power of an individual conferencing device—in the example shown, proxies that reach their limit would simply refuse new calls at which point the call would be diverted by the telephone system to the next proxy in the list (a common feature of telephone systems known as "hunting") which would accept the call.

Another benefit of the design and implementation is that network traffic generated on the channel 110 by each proxy is an aggregation of the audio from each endpoint connected to that proxy. Simply put, the amount of traffic on channel 110 is a multiple of the number of proxies connected to the channel and not the number of endpoints connected to all proxies. In the example shown, and assuming that each proxy has at least one or more endpoints 999 connected to it, the largest amount of traffic placed on the channel 110 would be 4 streams—one for each proxy and being an aggregation of all the audio received from the all the endpoints connected to that specific proxy.

Figure 23:
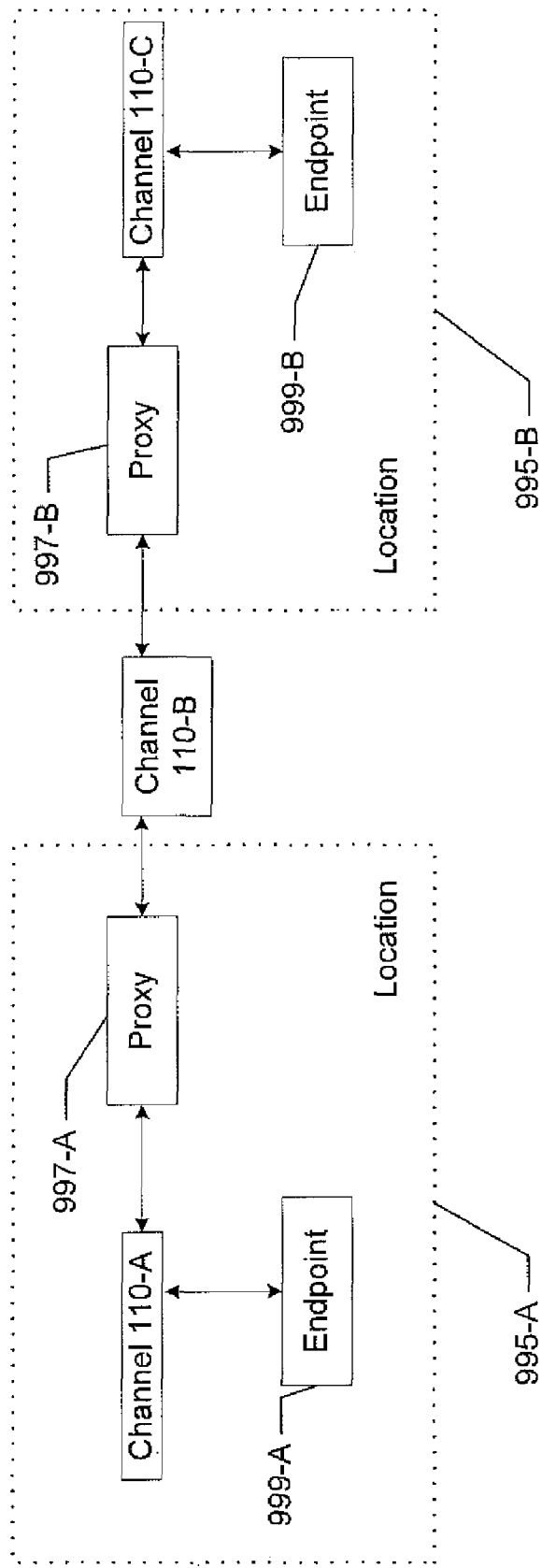
FIG. 23 is logical block diagram showing example connectivity between two proxies 997-A and 997-B via an alternate bandwidth, aggregated unicast channel 110-B so as to logically connect groups of endpoints 999-A and 999-B, each using high-bandwidth multicast channels 110-A and 110-C.

Channel Reflection, Aggregation, and Transcoding—FIG. 23: This example demonstrates a practical application of the ability for an embodiment of the invention to perform discrete and/or group-level operations on data—especially concerning repackaging of one or more channels' stream onto those of other channels. The ability for an embodiment of the invention to convert data from IP unicast to IP multicast (or in reverse), along with the ability to transcode (e.g., convert from one media format to another), and the ability for media to be aggregated (e.g., mixed according to administrator-defined parameters), allows for the propagation of data and media across different networking infrastructures and topologies. In the example diagram FIG. 23, a company's high-bandwidth local area networks in New York 995-A and London 995-B may be capable of IP multicast, but the Wide Area Network "WAN" linking those networks may not support multicast functionality and may also be limited in bandwidth. Embodiments of the invention may be used to create a "virtual IP multicast" even when a user's network does not support such topology across the entire network. Such "virtualization" of multicast is referred to in embodiments of the invention's terminology as channel reflection.

In the example, embodiments of the invention are placed on proxy devices 997-A and 997-B in each of the New York and London local area networks and, through standard IP routing configuration of said networks, provide a unicast channel connection 110-B across the WAN. In one direction (New York to London), the proxy 997-A in New York reads IP multicast network traffic from a channel 110-A on the New York LAN, aggregating media from multiple sources on said network and transcoding to a format and bandwidth suitable for transmission across the WAN using a unicast channel 110-B to a proxy 997-B in London. The proxy in London reads said transmission from the unicast channel 110-B on the WAN and resends it on the local network as a multicast channel 110-C so as to create a "virtual" multicast (multicasts 110-A and 110-B are linked in a virtual fashion via unicast 110-B). Traffic flowing from London to New York operates in a similar fashion; this time with the proxy 997-B in London aggregating and transcoding multi-source multicast traffic from channel 110-B on the London network to the far-end proxy 997-A in New York across the WAN using unicast channel 110-B. In New York, the proxy 997-A transcodes and resends unicast traffic read from unicast channel 110-B to multicast channel 110-A.

Figure 24:
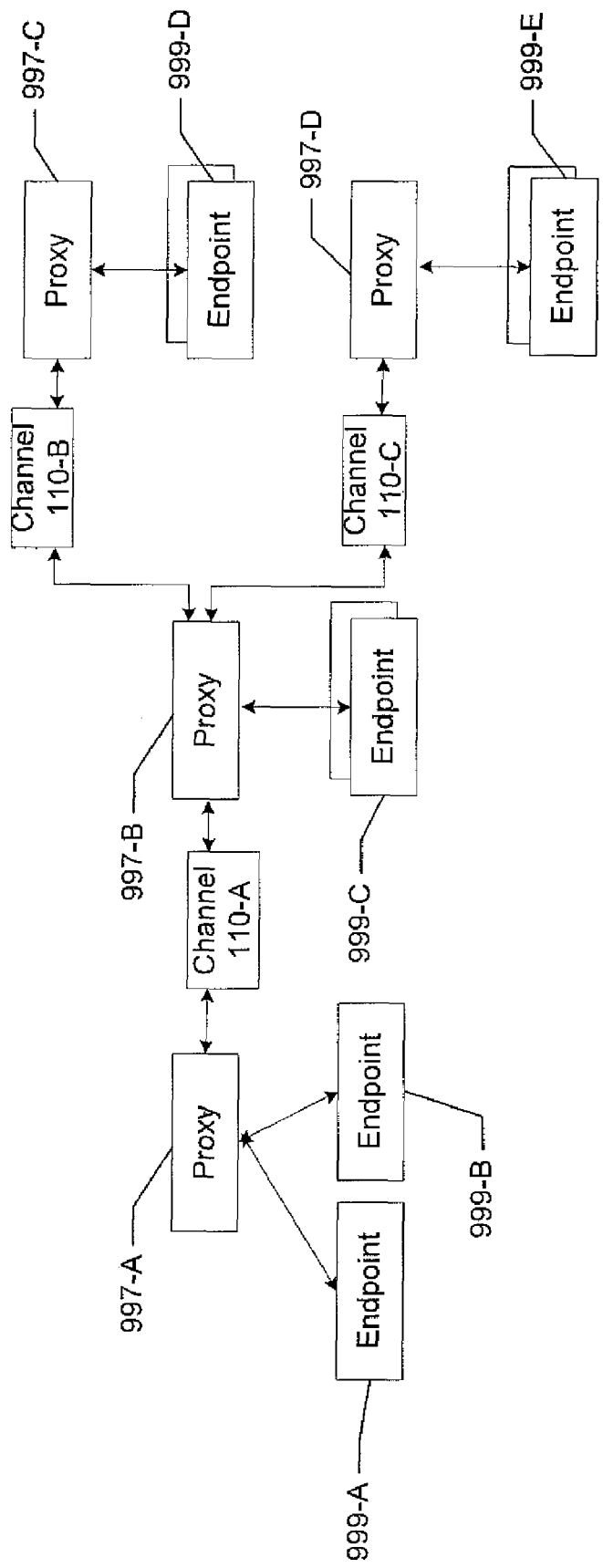
FIG. 24 is a logical block diagram showing example connectivity between a variety of proxies 997-A, 997-B, 997-C, and 997-D via channels 110-A, 110-B, and 110-C so as to create a cascaded dial-out conference between endpoints 999-A, 999-B, 999-C, and 999-D.

Cascaded Group Call—FIG. 24: In this example, embodiments of the invention residing on proxies 997-A, 997-B, 997-C, and 997-D operate in concert to establish a reverse conference call (or Group Call) wherein one or more endpoints 999-A initiates a conference by dialing into a proxy 997-A. In response, proxy 997-A makes outbound calls to one or more endpoints 999-B connecting those endpoints into the conference on proxy 997-A. At the same time, proxy 997-A makes an outbound connection to proxy 997-B via channel 110-A so as to cause a conference on proxy 997-B to start. In turn, proxy 997-B will make outbound connections to one or more endpoints 999-C, connecting said endpoints onto the local conference on proxy 997-B and, via channel 110-A to the conference on proxy 997-A. This allows audio between endpoints 999-A, 999-B, and 999-C.

While said connectivity is being established, proxy 997-B will, via channels 110-B and 110-C respectively, establish connections to proxies 997-C and 997-D, causing conferences on those proxies to start as well. In turn, proxies 997-C and 997-D will make outbound connections to 999-D and 999-E respectively, connecting those endpoints to conferences on the respective proxies making the outbound connections. Simultaneously, audio from proxies 997-C and 997-D will flow over channels 110-B and 110-C respectively to proxy 997-B. Such an arrangement ultimately allows for all endpoints (999-A, 999-B, 999-C, 999-D, and 999-E) to communicate with each other even though they are connected to different physical proxies.

Furthermore, the initiator of such a Group Call (in this case endpoint 999-A) may be granted the ability to automatically terminate the entire Group Call simply by disconnecting from the proxy (997-A in the case of the example diagram). Such disconnection indicates the end of the conferencing, resulting in proxy 997-A disconnecting all local participants 999-B as well as the connection to proxy 997-B. Such operation cascades through all of the proxies (e.g., when proxy 997-A disconnects from proxy 997-B, proxy 997-B will follow the same procedure, disconnecting all it's locally connected participants 999-C as well as the connections 110-B and 110-C to proxies 997-C and 997-D respectively). Each of those proxies will, in response, disconnect their local participants 999-D and 999-E respectively, ultimately resulting in the entire conference across all proxies and endpoints to terminate.

In conclusion, features of various embodiments disclosed herein include, but are not limited to, the following:

converting analog, digital, or mechanical control signals from a radio device into network data packets for transmission onto a computer network;

converting analog and/or digital audio signals from a radio device into network data packets for transmission onto a computer network;

converting signaling information contained in said network data packets into analog, digital, or mechanical control signals for relay to a radio device;

converting audio data contained in network data packets into analog and/or digital audio for relay to a radio device;

aggregating discrete audio data frames in a single time-envelope from a multiplicity of sources into a single frame—an "N" frame;

subtracting a discrete source frame from an aggregated "N" frame to produce an "N minus x" frame representative of audio from all sources except those subtracted;

automatically provisioning and simultaneously processing multiple receivers, each receiver comprising a means for accepting network data packets containing audio data from a multiplicity of sources;

accepting network data packets by said receivers on one or more network interfaces;

determining the data and media type on a packet-by-packet basis in real time;

determining a transmitter source for each said packet according to network address of the transmitter, data type transmitted by the transmitter, media type transmitted by the transmitter, and other pertinent information embedded in the packet or sent alongside the packet by the transmitter or its proxy;

dynamically provisioning separate queues to process data packet streams received from each said transmitter; and dynamically provisioning appropriate decoders to decode media data received from each said transmitter.

Additional features of one or more embodiments of a system for establishing a homogenized communications infrastructure that enables a variety of disparate communication devices to communicate transparently with each other over a computer data network, include but are not limited to the following:

a radio gateway device for converting analog and/or digital control signals from a radio device into network data packets for transmission onto a computer network;

a means for converting analog and/or digital audio signals from a radio device into network data packets for transmission onto a computer network;

a means for converting signaling information contained in said network data packets into analog and/or digital control signals for relay to a radio device;

a means for converting audio data contained in network data packets into analog and/or digital audio for relay to a radio device;

a means for aggregating discrete audio data frames in a single time-envelope from a multiplicity of sources into a single frame—an "N" frame;

a means for subtracting a set of discrete source frames from an aggregated "N" frame to produce an "N minus x" frame representative of audio from all sources except the ones subtracted;

a plurality of receivers for simultaneously processing multiple input signals, each receiver comprising a means for accepting network data packets containing audio data from a plurality of sources, whereby all network data packets are accepted by said receivers on a single network interface data and media type are determined on a packet-by-packet basis in real time;

a means of determining a transmitter source for each said packet according to a network address of the transmitter, data type transmitted by the transmitter, and medial type transmitted by the transmitter;

a means of providing separate queues to process data packet streams received from each said transmitter; and a plurality of decoders for decoding media data received from each said transmitter.

Features of yet another one or more embodiments for a method for bridging audio streams from a multitude of media sources and targets, include but are not limited to the following:

on-demand and/or static creation of bridging sessions;

dynamically adding and removing a plurality of physical and logical endpoint types in the conference;

propagating audio received from selected source endpoints to selected target endpoints;

where applicable, employment of standard and proprietary call signaling methods for receiving and placing calls over a computer data network;

where applicable, inserting and/or propagating instructions to remote devices for the purpose of causing land mobile radio systems to transmit audio onto the airwaves;

where applicable, propagating audio to in-memory and computer disk-based files for purposes of recording;

where applicable, processing audio from in-memory and computer disk-based files for purposes of distribution to selected target endpoints;

where applicable, the real-time, algorithmic generation of audio tones for purposes of distribution to selected target endpoints;

where applicable, propagating audio received from selected sources to selected sound processing devices; and where applicable, receiving audio from selected sound processing devices and propagation of that audio to selected target endpoints.

Still further, features of one or more embodiments of a system for bridging audio streams from a multitude of media sources and targets, include but are not limited to the following:

general-purpose or specialized computer hardware housing logic elements described by the invention;

connection between said computer hardware and one or more computer networks;

call processing logic capable of making and receiving calls over a computer data network using a plurality of standard and proprietary signaling protocols;

audio mixing logic responsible the aggregation of audio from one or more sources; and propagation logic responsible for the distribution of aggregated or non-aggregated audio to one or more targets.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, embodiments of the invention are not restricted to any particular data type, end device type, communication format or protocol, manufacturer device model, etc. For example, while one embodiment is described using summed PCM samples to generate the N frame, other techniques to mix or otherwise combine signals or other data from different participants can be used.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method to enable disparate endpoint communication devices to communicate with each other over a communication network, the method comprising:

converting information from any one of the endpoint communication devices from a first format used by respective endpoint communication devices to a second format to be communicated on a virtual communication channel supported by the communication network, wherein said converting the information from the first format to the second format includes converting the information into packets to be communicated on the virtual communication channel, the packets including identification information that identifies the virtual communication channel, wherein one or more of the endpoint communication devices, which is an end-user computing device, mixes the information, from all of the other endpoint communication devices, that is to be communicated on the virtual communication channel, wherein said end-user computing device said mixes the information instead of a centralized server to mix said information;

multicasting the converted information having the second format on the virtual communication channel to enable at least one endpoint communication device to receive the converted information from the virtual communication channel without having to establish handshaking protocols with every other endpoint communication device; and converting the information multicasted on the virtual communication channel from the second format to the first format used by the at least one endpoint communication device that receives the multicasted information.

2. The method of claim 1 wherein said multicasting the converted information on the virtual communication channel includes IP multicasting the converted information in a multicast session.

3. The method of claim 1 wherein the packets include further identification information that identifies a multicast group to which the packets belong.

4. The method of claim 1 wherein the information from any one of the endpoint communication devices includes audio data frames, the method further comprising:

aggregating, by said mixing, discrete audio data frames in a single time envelope from a multiplicity of sources, including at least some of the endpoint communication devices, into a single N frame; and
subtracting some data from the N frame.

5. The method of claim 4 wherein said aggregating discrete audio data frames into the single N frame includes sequentially ordering and summing pulse code modulation (PCM) sample values from single time envelopes from the multiplicity of sources, and wherein said subtracting some data from the N frame includes subtracting at least one PCM sample value from the summed PCM sample values in the N frame.

6. The method of 4 wherein said aggregating the frames further includes aggregating the frames at a proxy device coupled to the communication network, said proxy device being separate from any one of the endpoint communication devices.

7. The method of claim 1, further comprising:
validating data associated with a signal received from any one of the endpoint communication devices to determine whether the data can be processed;
transforming validated data to an encrypted or decrypted form;
placing the transformed data into an appropriate one of a plurality of queues;
converting the data in the queue from the first format to an intermediate format;
operating on the data to perform additional modifications thereto;
mixing the operated data with other operated data associated with signals received from the other endpoint communication devices; and
converting the data from the intermediate format to the second format to be communicated on the virtual communication channel.

8. The method of claim 1, further comprising unicasting at least some of the converted information having the second format on the virtual communication channel.

9. An article of manufacture, comprising:
a computer-readable medium having computer-readable instructions stored thereon that are executable by a processor to cause the processor to facilitate communication of disparate endpoint communication devices with each other over a communication network, by:
converting information from any one of the endpoint communication devices from a first format used by respective endpoint communication devices to a second format to be communicated on a virtual communication channel supported by the communication network,
wherein said converting the information from the first format to the second format includes converting the information into packets to be communicated on said virtual communication channel, the packets including identification information that identifies said virtual communication channel,
wherein one or more of the endpoint communication devices, which is an end-user computing device, mixes the information, from all of the other endpoint communication devices, that is to be communicated on the virtual communication channel, wherein said end-user computing device said mixes the information instead of a centralized server to mix said information;
multicasting the converted information having the second format on the virtual communication channel to enable at least one endpoint communication device to receive the converted information from the virtual communication channel without having to perform handshaking with other endpoint communication devices; and
converting the information multicasted on the virtual communication channel from the second format to the first format used by the at least one endpoint communication device that receives the multicasted information.

10. The article of manufacture of claim 9 wherein the computer-readable medium further includes computer-readable instructions stored thereon that are executable by the processor to cause the processor to facilitate communication of disparate endpoint communication devices with each other over the communication network, by:
aggregating, by said mixing, discrete audio data frames in a single time envelope from a multiplicity of sources, including at least some of the endpoint communication devices, into a single N frame; and
subtracting some data from the N frame.

11. The article of manufacture of claim 9 wherein the computer-readable medium further includes computer-readable instructions stored thereon that are executable by the processor to cause the processor to facilitate communication of disparate endpoint communication devices with each other over the communication network, by:
determining whether the information communicated from any one of the endpoint communication devices is valid;
if validated, transforming to encrypt or decrypt the information communicated from any one of the endpoint communication devices;
distributing the transformed information to at least one queue;
performing the converting of the information from the queue as a first conversion into an intermediate format;
operating on the information that is in the intermediate format;
mixing the operated information with other information associated with the other endpoint communication devices;
operating on the mixed information;
distributing the operated mixed information to at least one queue;
performing the converting of the mixed information from the queue as a second conversion from the intermediate format into packets to be placed on the communication network; and
transforming the packets to be placed on the communication network.

12. An apparatus, comprising:
an endpoint communication device, which is an end-user computing device that includes:
an output device;
a communication interface coupleable to a communication network; and
a processing module coupled to the communication interface to convert information from a first format to a second format to be communicated on a virtual communication channel supported by the communication network, the communication interface being coupled to multicast the converted information having the second format on the virtual communication channel to enable at least one other endpoint communication device to receive the converted information from the virtual communication channel without having to perform a handshake with the communication interface, the processing module being coupled to convert information multicasted on the virtual communication channel and received by the communication interface from the second format to the first format and to send the converted information having the first format to be displayed on the output device, wherein to convert the information from the first format to the second format, the processing module is configured to convert the information into packets to be communicated on the virtual communication channel, the packets including identification information that identifies the virtual communication channel, and wherein the processing module of said endpoint communication device is configured to mix information, from all of the other endpoint communication devices, that is to be communicated on the virtual communication channel, wherein said endpoint communication device is configured to said mix the information instead of a centralized server to mix said information.

13. The apparatus of claim 12 wherein the processing module includes:

a first module to determine whether the information communicated from any one of the endpoint communication devices is valid;

a second module coupled to the first module to transform validated information by encryption or decryption;

a third module coupled to the second module to distribute the transformed information to at least one queue;

a fourth module coupled to the third module to perform the conversion of the information from the queue as a first conversion into an intermediate format;

a fifth module coupled to the fourth module to operate on the information that is in the intermediate format;

a sixth module coupled to the fifth module to mix the operated information with other information associated with the other endpoint communication devices;

a seventh module coupled to the sixth module to operate on the mixed information;

an eight module coupled to the seventh module to distribute the operated mixed information to at least one queue;

a ninth module coupled to the eight module to perform the conversion of the mixed information from the queue as a second conversion from the intermediate format into packets to be placed on the communication network; and a tenth module coupled to the ninth module to transform the packets to be placed on the communication network.

14. The apparatus of claim 12 wherein the processing module includes:

a first element to said mix by aggregating discrete audio data frames in a single time envelope from a multiplicity of sources, including at least some other endpoint communication device adapted to communicate on the communication network, into a single N frame; and a second element coupled to the first element to subtract some data from the N frame.

15. The apparatus of claim 14 wherein the first element is adapted to sequentially order and sum pulse code modulation (PCM) sample values from single time envelopes from the multiplicity of sources, and wherein the second element is adapted to subtract at least one PCM sample value from the summed PCM sample values in the N frame.

16. The apparatus of claim 12 wherein the processing module is further configured to communicate with a proxy device.

17. The apparatus of claim 12 wherein the information in the first format comprises part of a computer data file.

18. The apparatus of claim 12 wherein the second format comprises a packet format having further identification information that identifies an IP multicast session associated with packets sent from the communication interface.

* * * * *